United States Patent
Kobayashi

(10) Patent No.: US 9,832,460 B2
(45) Date of Patent: Nov. 28, 2017

(54) IMAGE CODING APPARATUS, METHOD FOR CODING IMAGE, PROGRAM THEREFOR, IMAGE DECODING APPARATUS, METHOD FOR DECODING IMAGE, AND PROGRAM THEREFOR

(75) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/003,771

(22) PCT Filed: Feb. 27, 2012

(86) PCT No.: PCT/JP2012/001318
§ 371 (c)(1),
(2), (4) Date: Sep. 6, 2013

(87) PCT Pub. No.: WO2012/120822
PCT Pub. Date: Sep. 13, 2012

(65) Prior Publication Data
US 2013/0343664 A1 Dec. 26, 2013

(30) Foreign Application Priority Data
Mar. 9, 2011 (JP) .................................. 2011-051269

(51) Int. Cl.
*H04N 19/50* (2014.01)
*H04N 19/139* (2014.01)
(Continued)

(52) U.S. Cl.
CPC ..... *H04N 19/00569* (2013.01); *H04N 19/124* (2014.11); *H04N 19/139* (2014.11);
(Continued)

(58) Field of Classification Search
CPC ...... H04N 19/124; H04N 19/61; H04N 19/60; H04N 19/154; H04N 19/17; H04N 19/176;
(Continued)

(56) References Cited

U.S. PATENT DOCUMENTS 5,861,921 A * 1/1999 Shimizu et al. ..... H04N 19/176
375/240.04
6,064,435 A * 5/2000 Iwamura ............. H04N 19/176
348/699
(Continued)

FOREIGN PATENT DOCUMENTS

JP H05-075987 A 3/1993
JP H10-327410 A 12/1998
(Continued)

OTHER PUBLICATIONS

Kobayashi, Masaaki and Masato Shima. "Sub-LCU level delta QP signaling." Joint Collaborative Team on Video Coding (JCT-VC) of ITU-T SG16 WP3 and ISO/IEC JTC1/SC29/WG11, 5th Meeting: Geneve, CH, Mar. 16-23, 2011. Input (Proposal) Document (JCTVC-E198) to JCT-VC, 9 pages, saved Mar. 10, 2011.
(Continued)

*Primary Examiner* — Kim Vu
*Assistant Examiner* — Michael Vanchy, Jr.
(74) *Attorney, Agent, or Firm* — Canon USA, Inc. I.P. Division

(57) ABSTRACT

An image coding method for dividing an input image into a plurality of divisional blocks having different sizes, and coding the image for each of the divisional blocks includes acquiring attribute information of a target block, setting a control parameter for controlling an image quality of the target block, determining a prediction control parameter based on the attribute information, calculating a difference
(Continued)

value between the control parameter and the prediction control parameter, and coding the calculated difference value.

33 Claims, 26 Drawing Sheets

(51) Int. Cl.
*H04N 19/159* (2014.01)
*H04N 19/176* (2014.01)
*H04N 19/196* (2014.01)
*H04N 19/61* (2014.01)
*H04N 19/593* (2014.01)
*H04N 19/463* (2014.01)
*H04N 19/124* (2014.01)

(52) U.S. Cl.
CPC ......... *H04N 19/159* (2014.11); *H04N 19/176* (2014.11); *H04N 19/196* (2014.11); *H04N 19/463* (2014.11); *H04N 19/593* (2014.11); *H04N 19/61* (2014.11)

(58) Field of Classification Search
CPC .. H04N 19/179; H04N 19/172; H04N 19/146; H04N 19/126; H04N 19/152; H04N 19/13; H04N 19/91; H04N 19/14; G06T 9/005; G06T 9/007
USPC ................................................. 382/233, 238
See application file for complete search history.

(56) References Cited

U.S. PATENT DOCUMENTS

| | | |
|---|---|---|
| 2003/0133169 A1* | 7/2003 | Uchibayashi et al. ... 358/426.07 |
| 2009/0116759 A1* | 5/2009 | Suzuki et al. ................ 382/238 |

FOREIGN PATENT DOCUMENTS

| | | |
|---|---|---|
| JP | H11-112994 A | 4/1999 |
| JP | P2001-45494 A1 | 2/2001 |
| JP | 2006-014183 A | 1/2006 |
| JP | 2010-016454 A | 1/2010 |
| JP | 2012-170042 A | 9/2012 |
| WO | 2008/126135 A1 | 10/2008 |
| WO | 2009/158113 A2 | 12/2009 |
| WO | 2012/023806 A2 | 2/2012 |
| WO | 2012/056924 A1 | 5/2012 |

OTHER PUBLICATIONS

Sato, Kazushi. "Proposal on Large Block Structure and Quantization." Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010. Input (Proposal) Document (JCTVC-C167) to JCT-VC, 8 pages, saved Oct. 1, 2010.
Budagavi, Madhukar and Minhua Zhou. "Delta QP signaling at sub-LCU level." Joint Collaborative Team on Video Coding (JCT-VC) of ITU-T SG16 WP3 and ISO/IEC JTC1/SC29/WG11, 4th Meeting: Daegu, KR, Jan. 20-28, 2011. Input (Proposal) Document (JCTVU-D038) to JCT-VC, 5 pages, saved Jan. 19, 2011.
Dong, L., Liu, W. And K. Sato. "CU Adaptive Quantization Syntax Change for Better Decoder pipelining." Joint Collaborative Team on Video Coding (JCT-VC) of ITU-T SG16 WP3 and ISO/IEC JTC1/SC29/WG11, 4th Meeting: Daegu, KR, Jan. 20-28, 2011. Input (Proposal) Document (JCTVC-D258) to JCT-VC, 3 pages, saved Jan. 16, 2011.
Sato, Kazushi. "On LBS and Quantization." Joint Collaborative Team on Video Coding (JCT-VC) of ITU-T SG16 WP3 and ISO/IEC JTC1/SC29/WG11, 4th Meeting: Daegu, KR, Jan. 20-28, 2011. Input (Proposal) Document (JCTVC-D308r1) to JCT-VC, 12 pages, saved Jan. 22, 2011.
Okubo et al., "H.264/AVC Textbook: Third Revised Edition", Jan. 1, 2009, pp. 124-125.

* cited by examiner

Fig. 11A
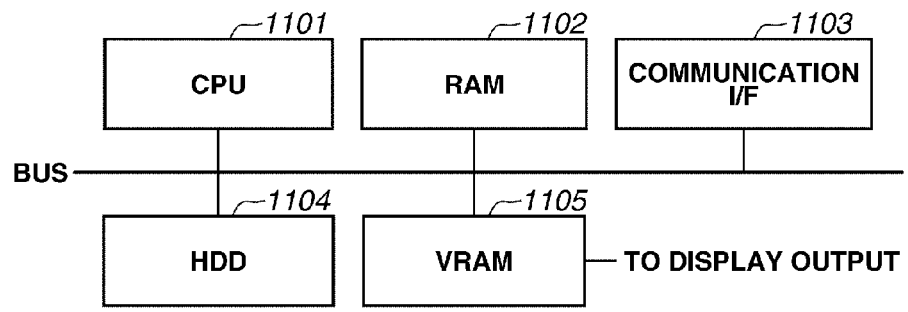
[Fig. 11B]
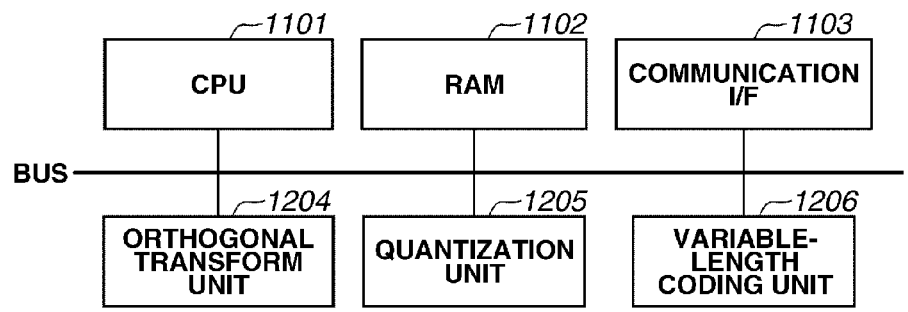
[Fig. 11C]
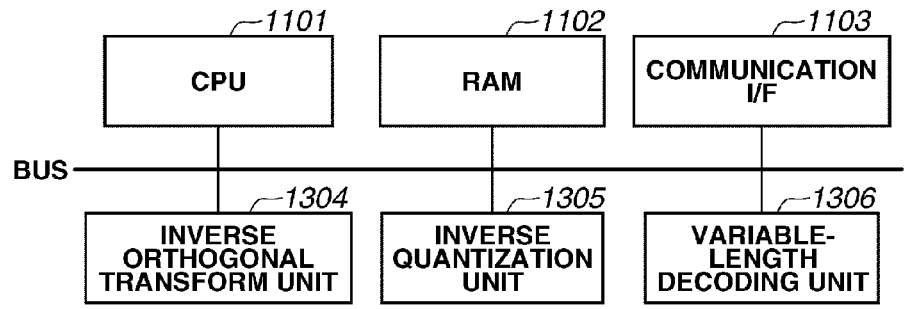

DIVISION STRUCTURE OF FRAME

| B1 | B2 | B3 | B4 | B6 | B7 | B8 | B9 | B10 | B11 | B12 | B13 |
|----|----|----|----|----|----|----|----|-----|-----|-----|-----|
| B14 | B15 | B16 | B17 | B18 | B19 | B20 | B21 | B22 | B23 | B24 | B25 |
| B26 | B27 | B28 | B29 | B30 | B31 | B32 | B33 | B34 | B35 | B36 | B37 |
| B38 | B39 | B40 | B41 | B42 | B43 | B44 | B45 | B46 | B47 | B48 | B49 |
| B50 | B51 | B52 | B53 | B54 | B55 | B56 | B57 | B58 | B59 | B60 | B61 |
| B62 | B63 | B64 | B65 | B66 | B67 | B68 | B69 | B70 | B71 | B72 | B73 |
| B74 | B75 | B76 | B77 | B78 | B79 | B80 | B81 | B82 | B83 | B84 | B85 |

DIVISION STRUCTURE OF LATTICE BLOCK

Fig. 14

| CASE | SELECTION OF BLOCK HAVING SIMILAR ATTRIBUTE | | | IDENTIFICATION VALUE | | | CODING METHOD |
|---|---|---|---|---|---|---|---|
| | LEFT | UPPER | UPPER RIGHT | LEFT | UPPER | UPPER RIGHT | |
| 1 | SELECTED | SELECTED | SELECTED | 0 | 1 | 2 | Golomb CODING |
| 2 | SELECTED | SELECTED | NOT SELECTED | 0 | 1 | — | 1-BIT DATA |
| 3 | SELECTED | NOT SELECTED | SELECTED | 0 | — | 1 | 1-BIT DATA |
| 4 | SELECTED | NOT SELECTED | NOT SELECTED | × | — | — | NOT SELECTED |
| 5 | NOT SELECTED | SELECTED | SELECTED | — | 0 | 1 | 1-BIT DATA |
| 6 | NOT SELECTED | SELECTED | NOT SELECTED | — | × | — | NOT SELECTED |
| 7 | NOT SELECTED | NOT SELECTED | SELECTED | — | — | × | NOT SELECTED |
| 8 | NOT SELECTED | NOT SELECTED | NOT SELECTED | 0 | 1 | 2 | Golomb CODING |

EXAMPLE DATA STRUCTURE OF FRAME

Fig. 19D

| Equation | Intra Prediction Index |
|---|---|
| pred_qp(curr) = pred_qp(left) | 9,33,17,32,8,31,16,30,1,29,15,28,7 |
| pred_qp(curr) = (qp(left)+qp(top_left))/2 | 27,14,26,3 |
| pred_qp(curr) = (qp(top_left)+qp(top))/2 | 18,10,19 |
| pred_qp(curr) = qp(top) | 4,20,11,21,0,22,12,23,5 |
| pred_qp(curr) = (qp(left)+qp(top_left))/2 | 24,13,25,6 |
| pred_qp(curr) = (qp(top)+qp(left))/2 | 2 |

IMAGE CODING APPARATUS, METHOD FOR CODING IMAGE, PROGRAM THEREFOR, IMAGE DECODING APPARATUS, METHOD FOR DECODING IMAGE, AND PROGRAM THEREFOR

TECHNICAL FIELD

The present invention relates to an image coding apparatus, a method for coding an image, a program therefor, an image decoding apparatus, a method for decoding an image, and a program therefor. More particularly, the present invention relates to a method for coding an image quality control parameter and a method for decoding an image quality control parameter.

BACKGROUND ART

As a method for compressing and recording a moving image, MPEG-2 Video (hereafter referred to simply as MPEG-2) (ISO/IEC 13818-2:2000 Information technique—Generic coding of moving pictures and associated audio information: Video) and H.264 (ISO/IEC 14496-10; 2004 Information technique—Coding of audiovisual targets—Part 10: Advanced Video Coding) are known. In recent years, the Joint Collaborative Team on Video Coding (JCT-VC) has been established as a collegial organization of the ITU-T and ISO/IEC. This organization advances standardization activities for the High Efficiency Video Coding (HEVC) which is a new moving image standard. For example, in a JCT-VC contribution JCTVC-A205.doc (http://wftp3.itu.int/av-arch/jctvc-site/201004_A_Dresden/), HEVC proposes an H.264-based improved technique.

With a coding method based on the orthogonal transform and quantization represented by MPEG-2, H.264, and HEVC, the coding side applies orthogonal transform and quantization to a predetermined block image to generate quantization coefficient data. In this case, the coding method controls the image quality by quantizing the image data by using an image quality control parameter which is called quantization parameter. Specifically, quantization by using a small quantization parameter value improves the image quality and increases the amount of codes, and quantization by using a large quantization parameter value degrades the image quality and reduces the amount of codes. In the coding processing, the coding method codes the image data while selecting an optimum quantization parameter value according to a target amount of codes in this way. This method is referred to as rate control with which TM5 (MPEG-2 Test Model 5 (TM5), Doc. ISO/IEC JTC1/SC29/WG11/N0400, Test Model Editing Committee, April 1993) and other various methods have been proposed. Japanese Patent Application Laid-Open No. 2001-45494 discusses a technique for determining the visual importance of an image area and controlling an image quality control parameter according to the importance.

Variable-length coding is applied to quantized quantization coefficient data to generate variable-length coding coefficient data. The quantization parameter is also coded to generate a quantization parameter code. For example, a quantization parameter generation method uses as a predictive quantization parameter a quantization parameter used to quantize a block quantized before a block subjected to quantization, and calculates a difference value between the predictive quantization parameter and a quantization parameter used to quantize the block subjected to quantization. This difference value, called Quantization Parameter Delta (QP_DELTA), is embedded in a bit stream as a quantization parameter code. The variable-length coding coefficient data and the quantization parameter code generated in this way are transmitted as a bit stream to a decoding unit via an optical disk medium or a network. The decoding side decodes the variable-length coding coefficient data and the quantization parameter code to generate quantization coefficient data and a quantization parameter, and applies inverse orthogonal transform and inverse quantization to the quantization coefficient data by using the quantization parameter to generate a decoded image.

With MPEG-2 and H.264, processing is performed in unit of a lattice block formed of 16×16 pixels formed by dividing an image called a macroblock. When the size of a block subjected to orthogonal transform is represented in pixel units, the block size is 8×8 pixels with MPEG-2, or 8×8 pixels or 4×4 pixels with H.264. Specifically, one macroblock includes a plurality of orthogonal transform blocks. Since MPEG-2 or H.264 enables controlling the quantization parameter in macroblock units (rate control), orthogonal transform blocks included in an identical macroblock are quantized based on a similar quantization parameter.

With HEVC, on the other hand, lattice blocks formed by dividing an image in lattice form are called Largest Coding Units (LCUs) each being formed of 64×64 pixels. Each LCU is divided into a plurality of smaller-sized blocks called Coding Units (CUs) by using the region quadtree structure. Each CU includes orthogonal transform blocks called Transform Units (TUs). Each TU is further divided into a plurality of smaller-sized blocks by using the region quadtree structure. Each unit of a quantization parameter has a division flag. A block having a True division flag includes four divisional blocks each being horizontally and vertically half in size of the block. A block having a False division flag does not include divisional blocks but has actual data of the block. There are various methods for determining whether a block is to be divided. As a method for determining whether a block is to be divided, Japanese Patent Application Laid-Open No. 2005-191706 discusses a technique for calculating a cost of blocks by using the Lagrange multiplier and selecting a block division method with a lowest cost.

With a quantization parameter coding method for coding as a quantization parameter code a difference value between a quantization parameter and a predictive quantization parameter of a block subjected to coding, the amount of quantization parameter codes increases with increasing absolute value of the difference value. When embedding a quantization parameter in block units in a conventional case, since there is only one method for calculating a predictive quantization parameter, the absolute value of the difference value increases, thus resulting in an unnecessarily increased amount of quantization parameter codes depending on the image coding method and image characteristics.

SUMMARY OF INVENTION

The present invention is directed to preventing an unnecessary increase in the amount of quantization parameter codes and to reducing the amount of quantization parameter codes.

According to an aspect of the present invention, an image coding method for dividing an input image into a plurality of divisional blocks having different sizes, and coding the image for each of the divisional blocks includes: acquiring attribute information of a target block; setting a control parameter for controlling an image quality of the target block; determining a prediction control parameter based on the attribute information; calculating a difference value between the control parameter and the prediction control parameter; and coding the calculated difference value.

According to an exemplary embodiment of the present invention, the amount of quantization parameter codes can be reduced.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 11A illustrates a hardware configuration according to exemplary embodiments of the present invention.

FIG. 11B illustrates a hardware configuration according to exemplary embodiments of the present invention.

FIG. 11C illustrates a hardware configuration according to exemplary embodiments of the present invention.

FIG. 14 is a table illustrating relations between block positions, and identification value conversion.

Figure 19D:
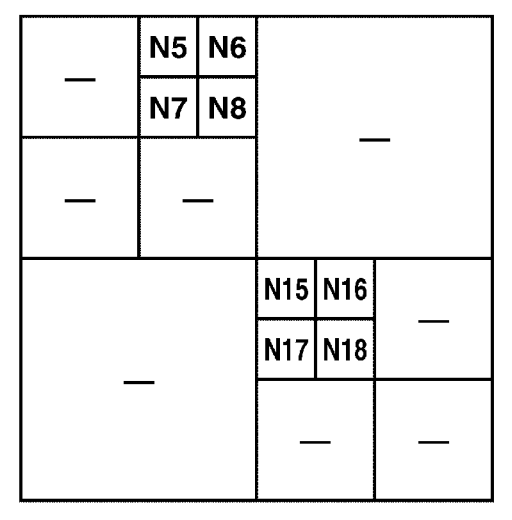

FIG. 19D illustrates an example division state of lattice blocks and division flags.

DESCRIPTION OF EMBODIMENTS

Various exemplary embodiments, features, and aspects of the invention will be described in detail below with reference to the drawings.

A method for coding a block subjected to coding according to a first exemplary embodiment of the present invention will be described below with reference to FIGS. 1, 11A, 11B, 11C, 15, and 20.

Figures 13A, 13B:
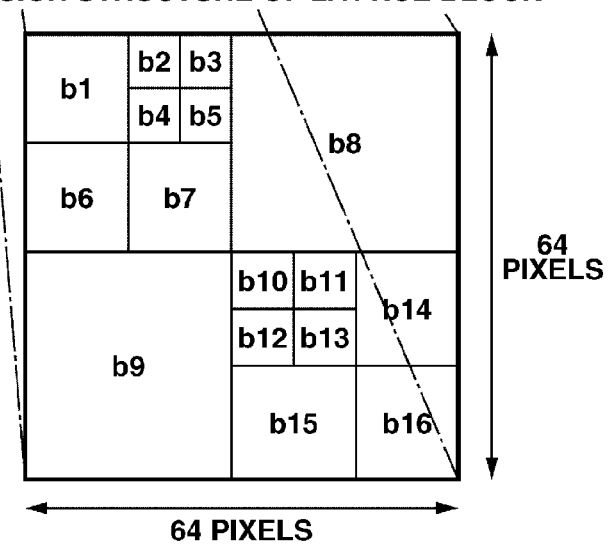
FIG. 13A illustrates example block division.
FIG. 13B illustrates example block division.

FIG. 11A illustrates a hardware configuration for executing a coding program including the coding method according to the first exemplary embodiment. This coding program is recorded on a hard disk drive (hereinafter referred to as HDD) 1104. When the coding program is activated, it is loaded into a read-only memory (RAM) 1102, and a central processing unit (CPU) 1101 executes each step of the coding program described below to perform coding processing. In the present exemplary embodiment, input image data is stored in the HDD 1104 and, a coded bit stream is also recorded on the HDD 1104. Coding processing with the above-mentioned configuration will be described below. In the present exemplary embodiment, a frame is divided into a plurality of lattice blocks each being formed of 64×64 pixels (hereinafter, a block formed of n×n pixels is referred to as an n×n block). Each lattice block is further divided, by using the region quadtree structure, into a plurality of divisional blocks each being formed of at least 8×8 pixels. Division blocks are subjected to coding processing. FIG. 13A illustrates an example state where a frame is divided into a plurality of lattice blocks. FIG. 13B illustrates an example state where a lattice block is further divided into a plurality of divisional blocks. Even when a lattice block is left undivided, processing is performed on the premise that the lattice block includes one 64×64 divisional block.

Figure 15:
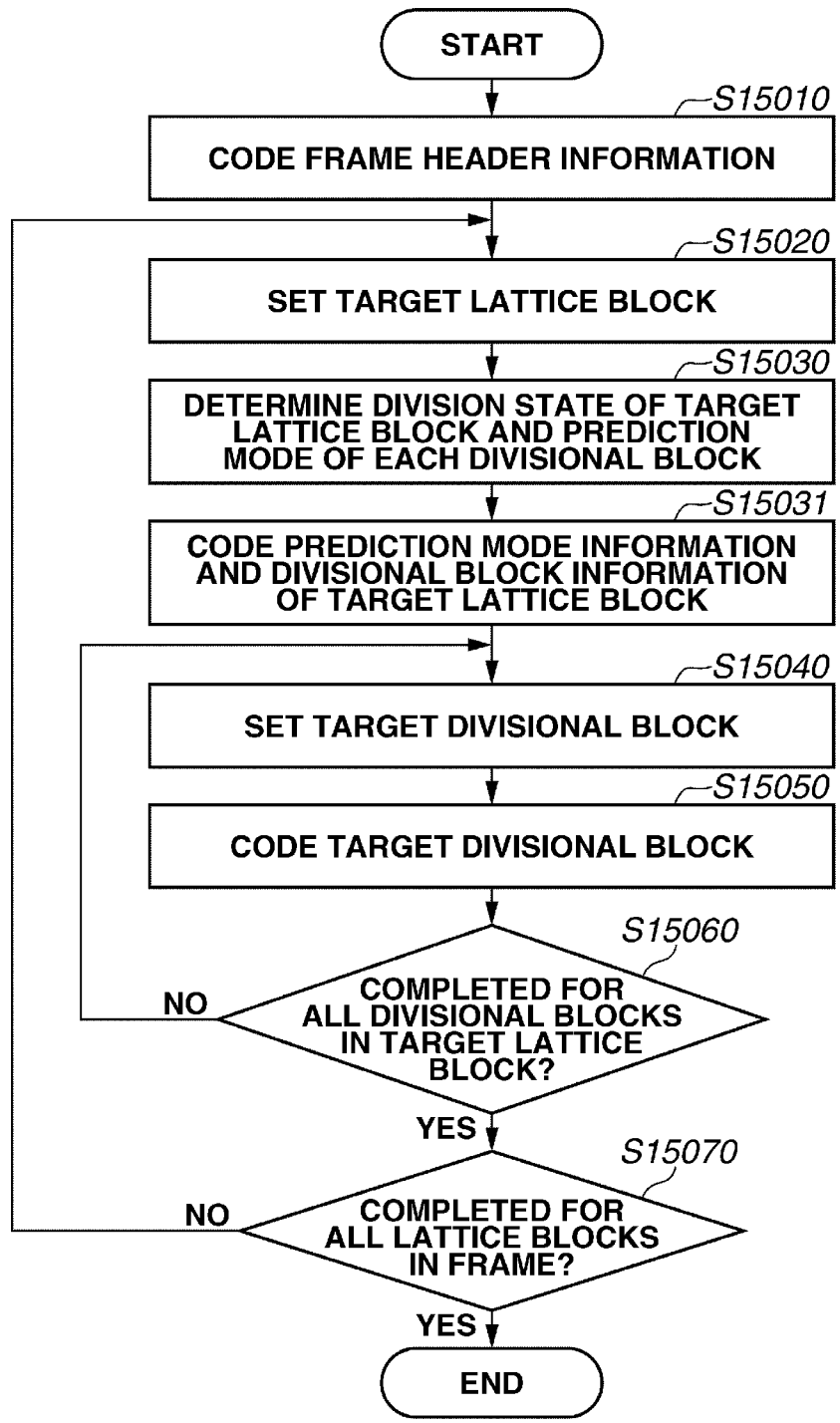
FIG. 15 is a flowchart illustrating a method for coding a frame.

FIG. 15 is a flowchart illustrating processing for coding the entire frame. In step S15010, the CPU 1101 codes the frame header information. The frame header information includes a frame synchronization code, and frame type information indicating whether the frame is an intra-frame or an inter-frame.

In step S15020, the CPU 1101 sets a lattice block subjected to processing (hereinafter referred to as target lattice block). A target lattice block subjected to the first processing is a lattice block at the top left corner of a frame. Subsequently, each time step S15020 is executed, a lattice block is set in order of raster scanning, for example, in order of lattice block numbers (B1, B2, . . . ) illustrated in FIG. 13A.

In step S15030, the CPU 1101 determines a division state of the target lattice block and a prediction mode (described below) of each divisional block therein. The target lattice block is divided into a plurality of divisional blocks by using the region quadtree structure, as illustrated in FIG. 13B. In the present exemplary embodiment, the prediction mode indicates an intra-prediction mode and an inter-prediction mode. The intra-prediction mode is a mode in which an intra-predicted image block is generated referring to neighboring divisional blocks of a divisional block subjected to processing (hereinafter referred to as target divisional block) as is the case with H.264, and the inter-prediction mode is a mode in which a motion compensation predicted image block is generated by determining a motion vector.

In step S15031, the CPU 1101 codes prediction mode information and divisional block information of divisional blocks in the target lattice block. The prediction mode information includes a prediction mode flag and additional information about the prediction mode. For example, in the intra-prediction mode, the additional information is intra-prediction method information. In the inter-prediction mode, the additional information is motion vector information or motion vector derivation block identification information for identifying a neighboring block having a similar motion vector as the target divisional block. For example, the motion vector derivation block identification information is composed of a 1-bit motion vector identification flag and a motion vector prediction direction flag. When the motion vector identification flag is 1, the motion vector prediction direction flag is embedded but a motion vector is not. Otherwise, when the motion vector identification flag is 0, a motion vector is embedded but the motion vector prediction direction flag is not. Further, when the motion vector prediction direction flag is 1, a motion vector of the left block is considered as a motion vector of the target block. Otherwise, when the motion vector prediction direction flag is 0, a motion vector of the upper block is considered as a motion vector of the target block. When embedding the motion vector derivation block identification information, a motion vector can be derived from the motion vector derivation block identification information in decoding processing without embedding the motion vector information in a bit stream. Although, in the present exemplary embodiment, the motion vector prediction direction flag is handled as a 1-bit flag, the flag configuration is not limited thereto. The motion vector prediction direction flag may be a multivalued flag to enable selection from a plurality of block candidates including the upper left and upper right blocks, etc., in addition to the upper and left blocks. Similar to the prediction mode with the 16×16 intra-prediction block in H.264, the intra-prediction method information is used to identify, for example, horizontal prediction, vertical prediction, DC prediction, and planar prediction.

Figure 18A:
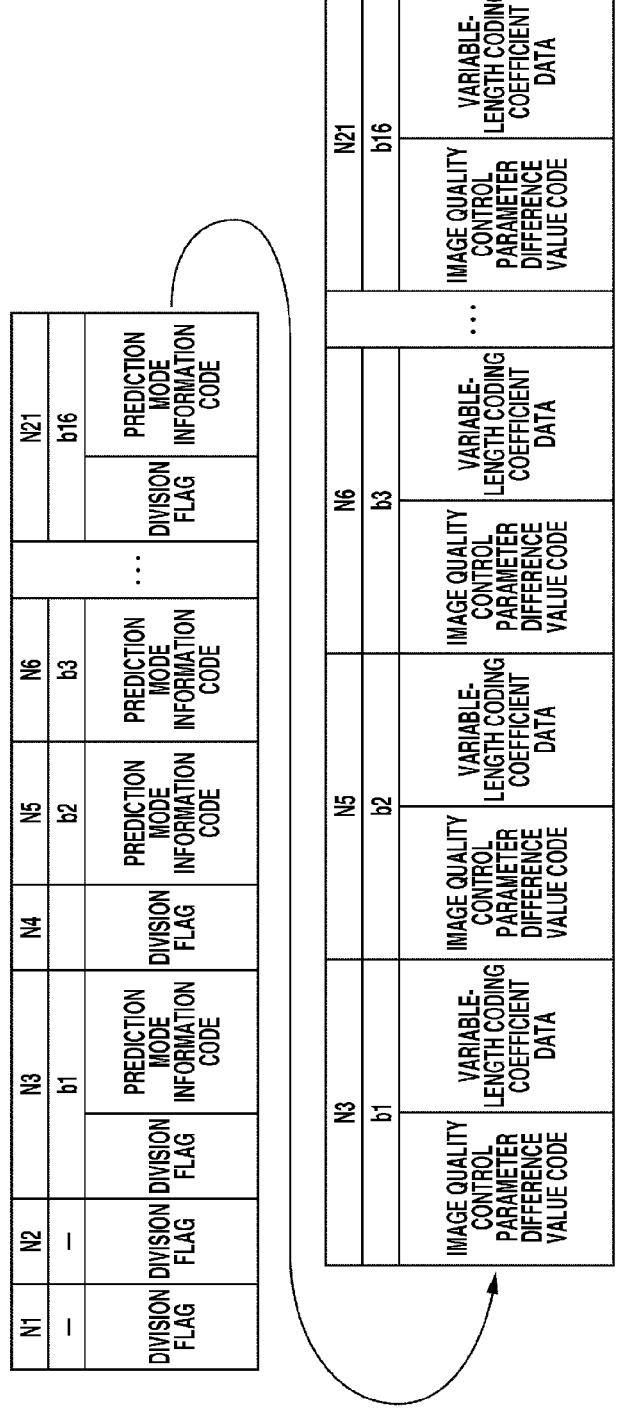
FIG. 18A illustrates an example configuration of bit streams of lattice blocks.

A prediction mode information code, i.e., variable-length coded prediction mode information, is embedded in a bit stream. The divisional block information is information about a division state indicating whether each node (block) of the region quadtree structure is to be further divided into smaller divisional blocks. The divisional block information for a certain node (block) is considered as a division flag. For example, when a lattice block is divided into divisional blocks as illustrated in FIG. 13B, division states for different block sizes are as illustrated in FIGS. 19A, 19B, 19C, and 19D. FIGS. 19A, 19B, 19C, and 19D illustrate division states of 64×64, 32×32, 16×16, and 8×8 blocks, respectively. The division state (1) indicates that the block is further divided into smaller blocks, and the division state (0) indicates that the block is left undivided. Reference numerals N1, N2, . . . , N21 indicate node (block) numbers for the region quadtree structure. These node numbers set the order of scanning the region quadtree structure by depth priority search in each layer, and the scanning order of the upper left, upper right, lower left, and lower right blocks within an identical block (hereinafter referred to as the order of the region quadtree structure). "–" indicates that no node (block) exists. By transmitting as divisional block information the division flags of node numbers N1, N2, . . . , N21 to the decoding unit, the region quadtree structure can be reconstructed also on the side of the decoding unit. The prediction mode information code and division flag are embedded in a bit stream for each divisional block, for example, in a structure as illustrated in FIG. 18A. Referring to FIG. 18A, node numbers N1, N2, . . . , N21 correspond to node (block) numbers in FIGS. 19A, 19B, 19C, and 19D, and reference numerals b1, b2, . . . , b16 correspond to divisional block numbers in FIG. 13B. With node numbers N1, N2, . . . , N21, the prediction mode information is added only to blocks no longer dividable, i.e., divisional blocks corresponding to reference numerals b1, b2, . . . , b16.

In step S15040, the CPU 1101 sets a target divisional block. At the first time, the CPU 1101 sets the upper left block in the lattice block. Subsequently, each time step S15040 is executed, the CPU 1101 sets a divisional block in order of the region quadtree structure, for example, in order of the divisional block numbers b1, b2, . . . , b16 illustrated in FIG. 13B.

In step S15050, the CPU 1101 codes the target divisional block set in step S15040. Detailed processing in this step will be described below. In step S15060, the CPU 1101 determines whether processing is completed for all divisional blocks in the target lattice block. When processing is completed for all divisional blocks in the target lattice block (YES in step S15060), the processing proceeds to S15070. Otherwise, when processing is not completed for all divisional blocks in the target lattice block (NO in step S15060), the processing returns to step S15040. When processing is completed for all divisional blocks for one lattice block, a bit stream of the lattice block, having a structure as illustrated in FIG. 18A, is generated.

Figure 17:
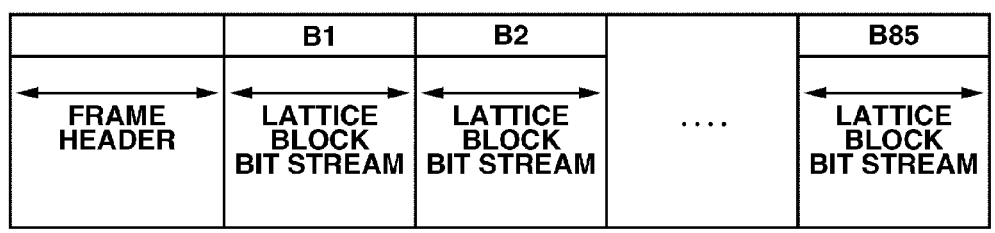
FIG. 17 illustrates an example configuration of a bit stream of a frame.

In step S15070, the CPU 1101 determines whether processing is completed for all lattice blocks in the frame. When processing is completed for all lattice blocks in the frame (YES in step S15070), the processing exits the flowchart in FIG. 15. Otherwise, when processing is not completed for all lattice blocks in the frame (NO in step S15070), the processing returns to step S15020. When processing is completed for all lattice blocks in the frame, a bit stream of the frame, having a structure as illustrated in FIG. 17A, is generated.

Figure 1:
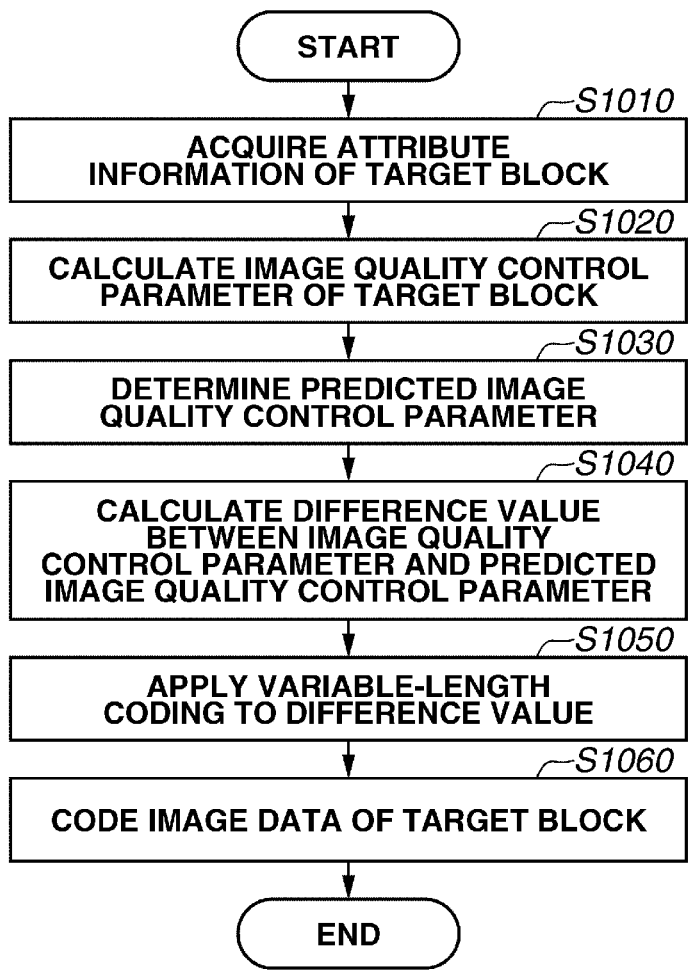
FIG. 1 is a flowchart illustrating a divisional block coding method according to a first exemplary embodiment of the present invention.

FIG. 1 is a detailed flowchart illustrating the divisional block coding method executed in step S15050 in FIG. 15.

In step S1010, the CPU 1101 acquires attribute information of the target divisional block. Although, in the present exemplary embodiment, the block size is used as attribute information, the attribute information is not limited thereto. For example, the attribute information may be block mode information for identifying intra- and inter-prediction, a motion vector, or an intra-prediction method in intra-prediction. Using these pieces of attribute information alone or in combination, an image quality control parameter of a last coded divisional block having a similar attribute as the target divisional block may be used as a predicted image quality control parameter. The motion vector does not need to be identical, and may be regarded as identical if an absolute value of a vector difference is equal to or less than a fixed value.

In step S1020, the CPU 1101 calculates an image quality control parameter of the target divisional block. The image quality control parameter is calculated so that, for example, the amount of frame codes becomes a preset target value. In this case, the image quality control parameter can be adjusted so that each region has a different image quality control parameter aiming at improving the image quality of a region having specific image components, such as a human face, an object edge, etc.

In step S1030, the CPU 1101 acquires an image quality control parameter of a last coded divisional block having a similar attribute as the target divisional block, as a prediction control parameter. In the present exemplary embodiment, since the block size is used as attribute information, the CPU 1101 records, updates, and refers to the image quality control parameter for each block size. Detailed processing in this step will be described below.

In step S1040, the CPU 1101 calculates a difference value between the image quality control parameter of the target divisional block and the predicted image quality control parameter to acquire an image quality control parameter difference value.

In step S1050, the CPU 1101 codes the image quality control parameter difference value to generate an image quality control parameter difference value code. The image quality control parameter difference value code is embedded in a bit stream in a structure as illustrated in FIG. 18A.

In step S1060, the CPU 1101 codes the image data of the target divisional block. In the present exemplary embodiment, according to the prediction mode, the CPU 1101 generates residual data of the target divisional block and applies orthogonal transform, quantization, and variable-length coding to the residual data to code the residual data and generate variable-length coding coefficient data. In this case, the variable-length coding coefficient data is embedded in a bit stream in the structure as illustrated in FIG. 18A.

Figure 20:
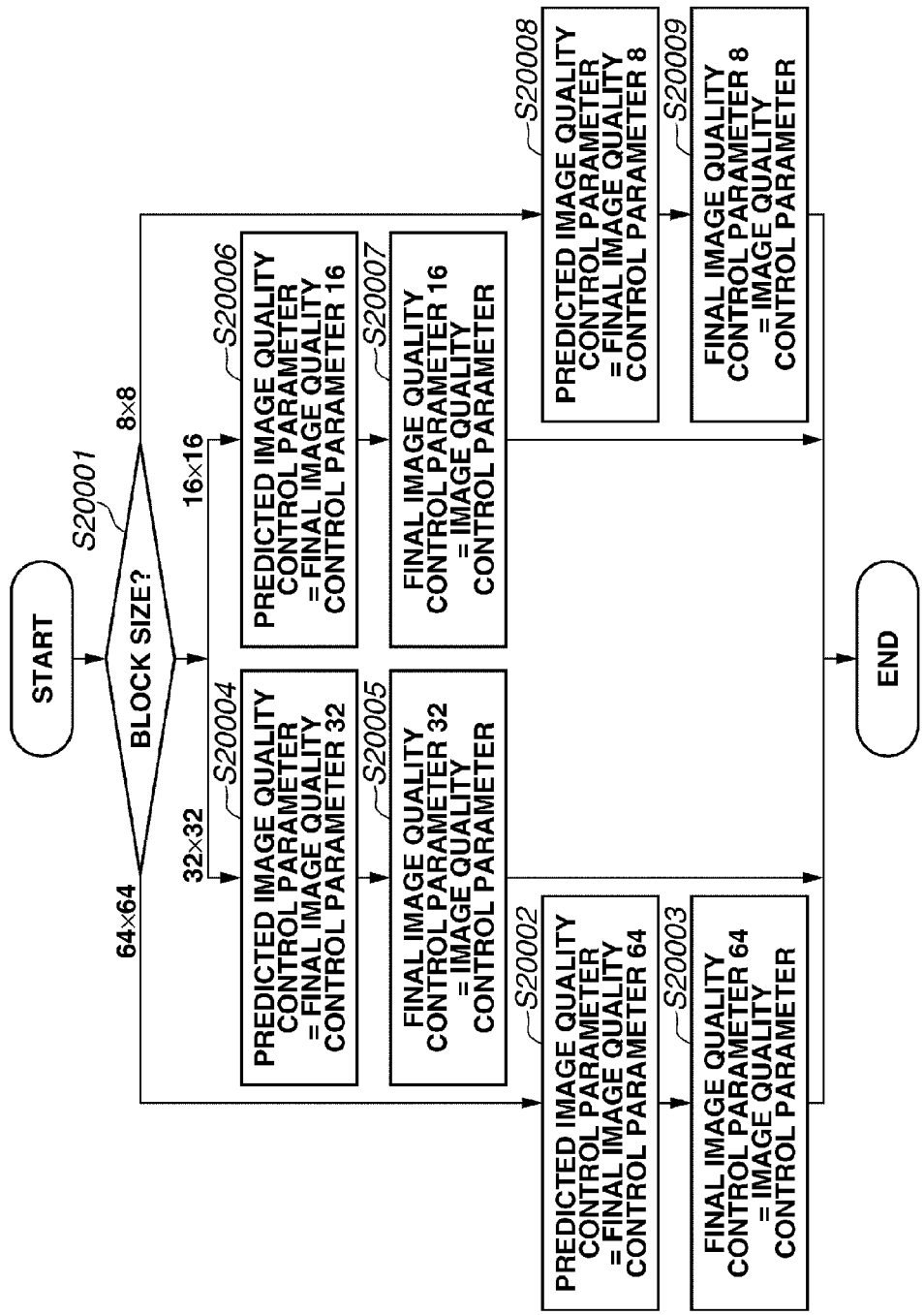
FIG. 20 is a flowchart illustrating a predicted image quality control parameter acquisition method for each block size of a divisional block.

FIG. 20 is a flowchart illustrating a predicted image quality control parameter acquisition method for each block size determined in step S1030 in FIG. 1. In this flowchart, final image quality control parameters 64, 32, 16, and 8 are used. These parameters are commonly used in processing in the frame, and are to be initialized when decoding is started or for each processing unit such as frame and slice.

In step S20001, the CPU 1101 determines the block size of the target block, and performs processing for each block size. Specifically, when the block size is 64×64, 32×32, 16×16, and 8×8 pixels (64×64, 32×32, 16×16, and 8×8 in step S20001, respectively), the processing proceeds to steps S20002 and S20003, steps S20004 and S20005, steps S20006 and S20007, and steps S20008 and S20009, respectively.

In step S20002, the final image quality control parameter 64 is set as a predicted image quality control parameter.

In step S20003, the CPU 1101 records the image quality control parameter of the target divisional block to the final image quality control parameter 64. Recording a parameter value in this way enables easily referring to the parameter value next time a 64×64 block is processed.

Subsequently, when the block size is 32×32, 16×16, 8×8 pixels, the CPU 1101 executes similar processing in steps S20004 and S20005, steps S20006 and S20007, and steps S20008 and S20009, respectively. A predicted image quality control parameter acquired in these steps will be used in step S1040.

Figure 22:
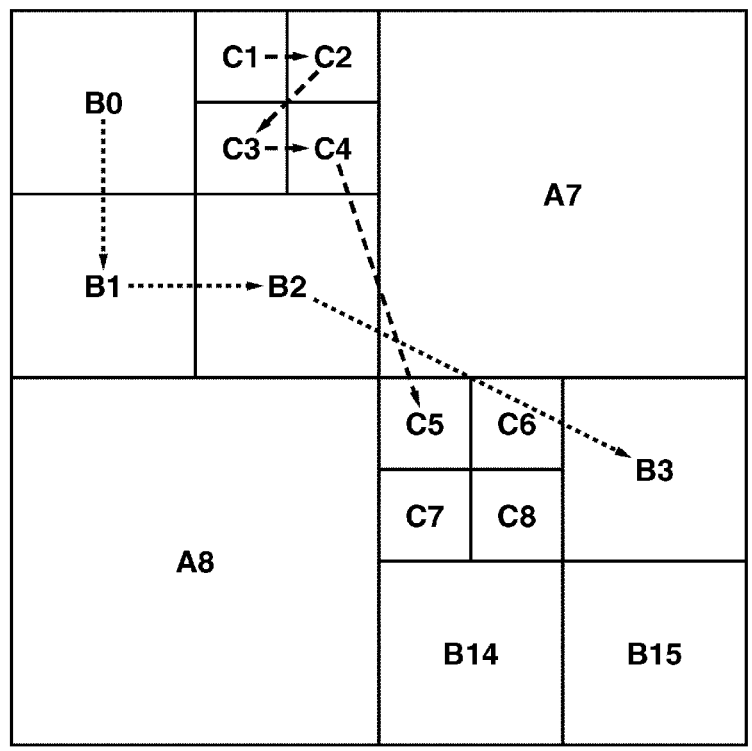
FIG. 22 illustrates referential relations between image quality control parameters of respective blocks.

FIG. 22 illustrates referential relations between image quality control parameters of respective blocks by using arrows. Referring to FIG. 22, for example, when a block B2 is a target divisional block, an image quality control parameter of a last coded block B1 having a similar block size as the target divisional block is set as a predicted image quality control parameter of the block B2. When a block C5 is a target divisional block, an image quality control parameter of a last coded block C4 having a similar block size as the target divisional block is set as a predicted image quality control parameter of the block C5. Thus, in the present exemplary embodiment, image quality control parameters of blocks having different sizes are referred to as predicted image quality control parameters independently for each block size. In many cases, blocks having a similar attribute are coded based on image quality control parameters having identical or close values. For example, there is a tendency that the coding efficiency is improved by coding an image block having many low-frequency components based on a large block size and by coding an image block having many high-frequency components, such as an edge, based on a small block size. Therefore, the block size at the time of block division is also likely to be determined according to this tendency. When controlling image quality control parameters aiming at improving the image quality of a region having a specific image component, image quality control parameters are highly likely to have close values for each block size. Therefore, the technique according to the present exemplary embodiment provides a smaller absolute value of a difference value than a case of calculating a difference value simply by using an image quality control parameter of a last coded block, as a predicted image quality control parameter. This means that the technique provides a smaller amount of codes at the time of image quality control parameter coding.

Although, in the present exemplary embodiment, the lattice block size is 64×64 pixels and the minimum divisional block size is 8×8 pixels, the block size is not limited thereto. Further, the coding method according to the present exemplary embodiment may be configured by dedicated hardware such as an orthogonal transform unit 1003, a quantization unit 1004, and a variable-length coding unit 1005, as illustrated in FIG. 11B. Further, the image quality control parameter calculation method according to the present exemplary embodiment may be configured by dedicated hardware such as a code amount control unit (not illustrated). In this case, the CPU 1101 executes similar processing to the flowcharts in FIGS. 1 and 15. However, the CPU 1101 does not execute orthogonal transform processing, quantization processing, variable-length coding processing, and control processing, but instructs the hardware to execute these pieces of processing.

An image decoding method according to a second exemplary embodiment of the present invention for decoding coded data generated by the image coding method according to the first exemplary embodiment will be described below with reference to FIGS. 6, 11A, 11B, 11C, 16, and 20.

FIG. 11A illustrates a hardware configuration for executing a decoding program including the decoding method according to the second exemplary embodiment. Decoding processing is achieved when the CPU 1101 loads the decoding program from the HDD 1104 into the RAM 1102, and executes each step of a flowchart (described below). Input code data is read from the HDD 1104 and a decoded image is output to a display via a video RAM (VRAM) 1105. Although the decoding processing is performed on a block basis, a decoded image for one frame is completed when decoded images of blocks acquired by decoding respective blocks are copied to a suitable position in the RAM 1102 and the decoding processing is completed for all blocks of one frame ends. Then, the generated frame is output to the VRAM 1105.

An input bit stream is the bit stream generated in the first exemplary embodiment.

Figure 16:
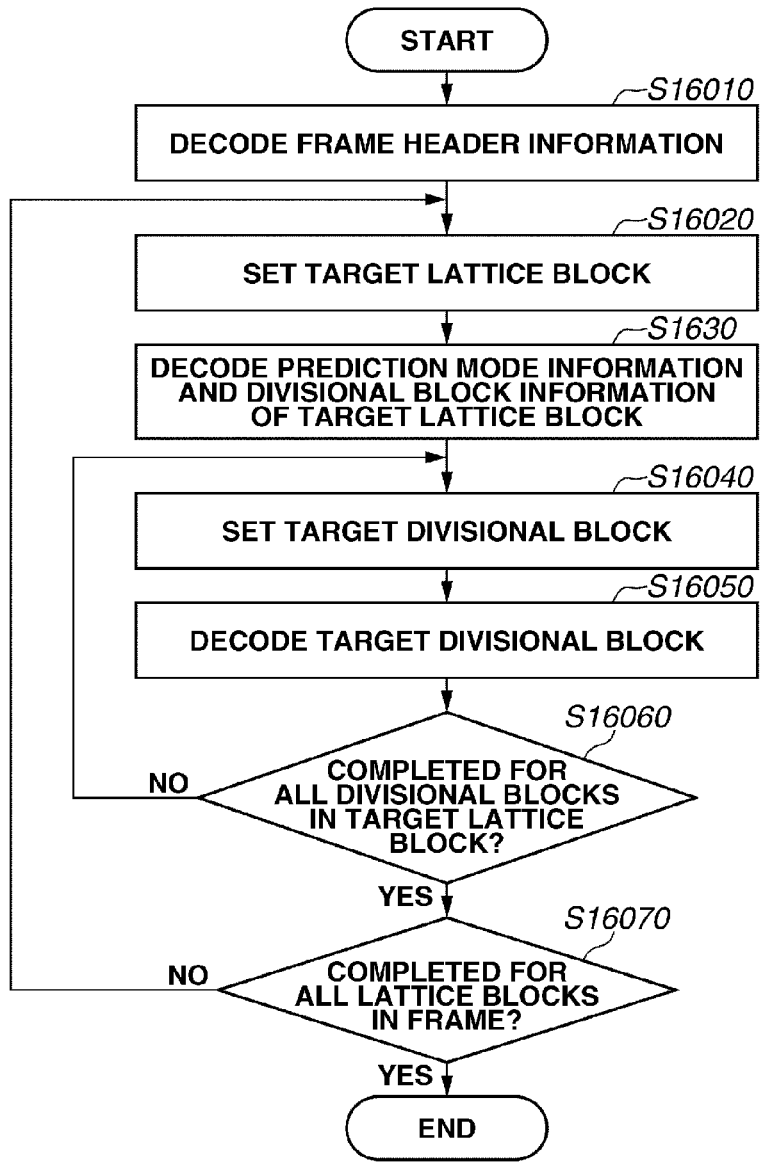
FIG. 16 is a flowchart illustrating a method for decoding a frame.

FIG. 16 is a flowchart illustrating processing for decoding the input bit stream. Each lattice block is decoded in order of raster scanning.

In step S16010, the CPU 1101 decodes the frame header information illustrated in FIG. 17A. In step S16020, the CPU 1101 sets a target lattice block subjected to processing. The target lattice block subjected to the first processing is the lattice block at the top left corner of the screen. Subsequently, each time step S16020 is executed, the CPU 1101 sets a target lattice block in order of raster scanning, for example, in order of the lattice block numbers (B1, B2, . . . ) illustrated in FIG. 13A.

In step S16030, the CPU 1101 decodes the division state of the target lattice block, and the prediction mode for each divisional block. In this step, the region quadtree structure of divisional blocks is restored based on the division flag. Prediction mode information is also decoded for each divisional block, and the attribute information of each divisional block can be acquired.

In step S16040. the CPU 1101 sets a target divisional block based on the order of the region quadtree structure restored in step S16030, for example, in order of the divisional block number (b1, b2, . . . ) illustrated in FIG. 13B. In step S16050, the CPU 1101 decodes image data of the target divisional block. Detailed processing in this step will be described below with reference to FIG. 6.

In step S16060, the CPU 1101 determines whether processing is completed for all divisional blocks in the lattice block. When processing is completed for all divisional blocks (YES in step S16060), the processing proceeds to perform S16070. Otherwise, when processing is not completed for all divisional blocks (NO in step S16060), the processing returns to step S16040.

In step S16070, the CPU 1101 determines whether processing is completed for all lattice blocks in the frame. When processing is completed for all lattice blocks (YES in step S16070), the processing exits this flowchart. Otherwise, when processing is not completed for all lattice blocks (NO in step S16070), the processing returns to step S16020 to reexecute steps S16020 to S16070.

Figure 6:
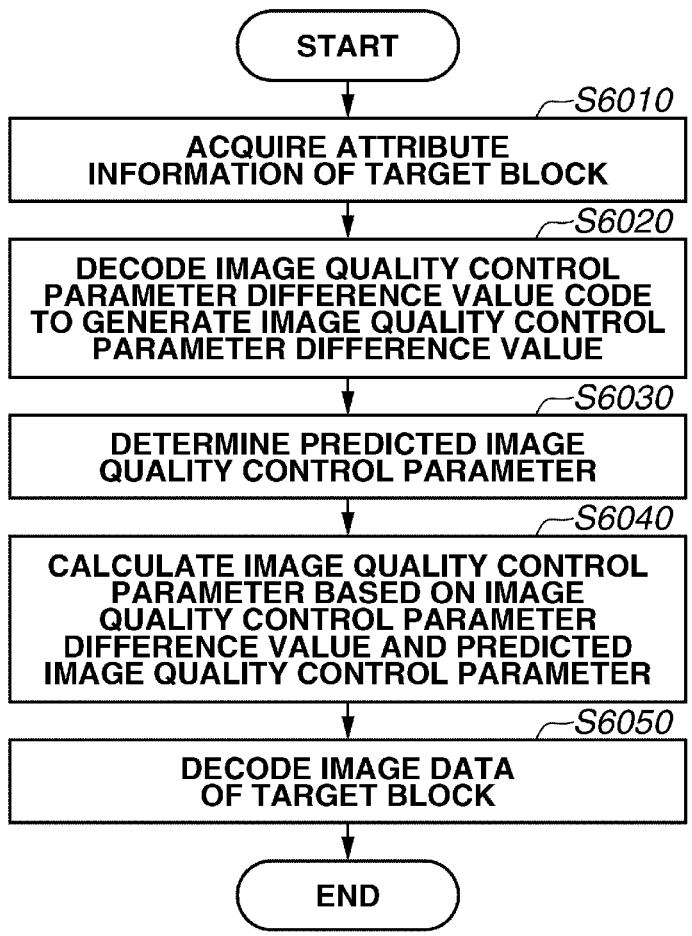
FIG. 6 is a flowchart illustrating a divisional block decoding method according to a second exemplary embodiment of the present invention.

FIG. 6 is a detailed flowchart illustrating processing executed in step S16050 in FIG. 16. In step S6010, the CPU 1101 acquires attribute information of the target divisional block. Although, in the present exemplary embodiment, the block size is used as attribute information, the attribute information is not limited thereto. In step S6020, the CPU 1101 decodes the image quality control parameter difference value code to generate an image quality control parameter difference value.

In step S6030, the CPU 1101 sets a last decoded divisional block having attribute information identical to that of the target divisional block acquired in step S6010, as a predicted image quality control parameter. In the present exemplary embodiment, since the block size is used as attribute information, the CPU 1101 records and refers to an image quality control parameter for each block size.

In step S6040, the CPU 1101 adds the image quality control parameter difference value to the predicted image quality control parameter to calculate an image quality control parameter of the target block.

In step S6050, the CPU 1101 decodes the image data of the target divisional block. In the decoding processing for a target block according to the present exemplary embodiment, the CPU 1101 applies variable-length decoding, inverse quantization, and inverse orthogonal transform to variable-length coding coefficient data to generate residual data. Further, according to the prediction mode, the CPU 1101 generates a predicted image and adds the residual data to the predicted image to obtain a decoded image of the divisional block. At the time of inverse quantization, the CPU 1101 uses the image quality control parameter calculated in step S6040 as a quantization parameter.

Applying the technique according to the second exemplary embodiment enables decoding a bit stream coded by the image coding method according to the first exemplary embodiment.

The decoding method according to the second exemplary embodiment may be configured by dedicated hardware such as an inverse orthogonal transform unit 1304, an inverse quantization unit 1305, a variable-length decoding unit 1306, and a code amount control unit (not illustrated), as illustrated in FIG. 11C. In this case, the CPU 1101 executes similar processing to the flowcharts in FIGS. 6 and 16. However, the CPU 1101 does not execute inverse orthogonal transform, inverse quantization, and variable-length decoding processing, but instructs the hardware to execute these pieces of processing.

An image coding method according to a third exemplary embodiment of the present invention will be described below with reference to FIG. 2. Unless otherwise described, the configuration and processing of each step in the present exemplary embodiment are similar to those of the first exemplary embodiment.

Figure 2:
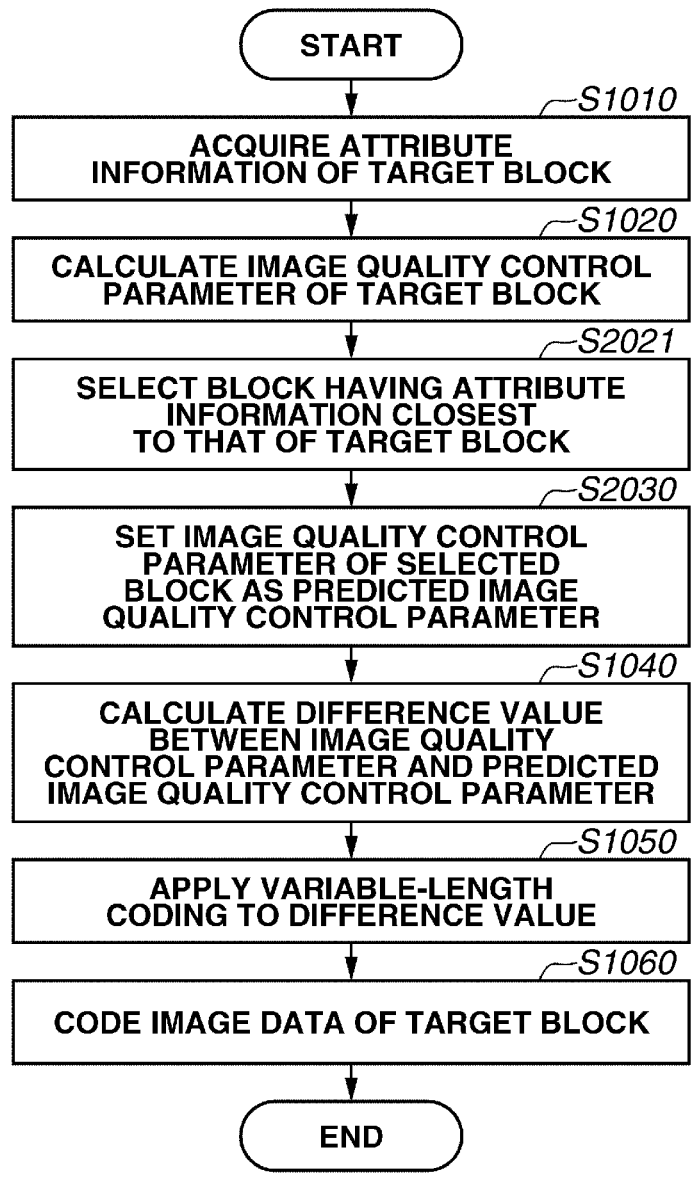
FIG. 2 is a flowchart illustrating a divisional block coding method according to a third exemplary embodiment of the present invention.

FIG. 2 is a detailed flowchart illustrating a divisional block coding method. In this flowchart, step S2021 is added following step S1020 in FIG. 1. In the third exemplary embodiment, the target divisional block is an inter-block.

Figure 12A:
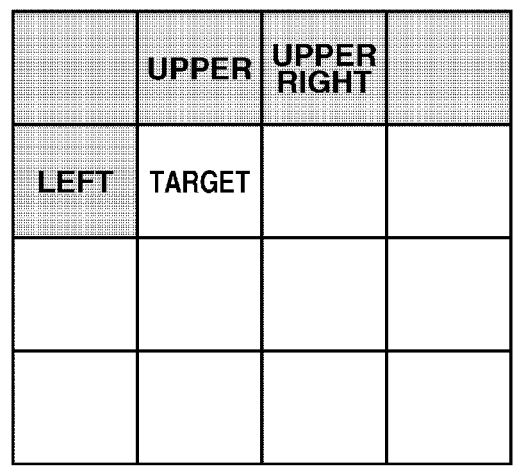
FIG. 12A illustrates a relation between positions of neighboring blocks.
Figure 12B:
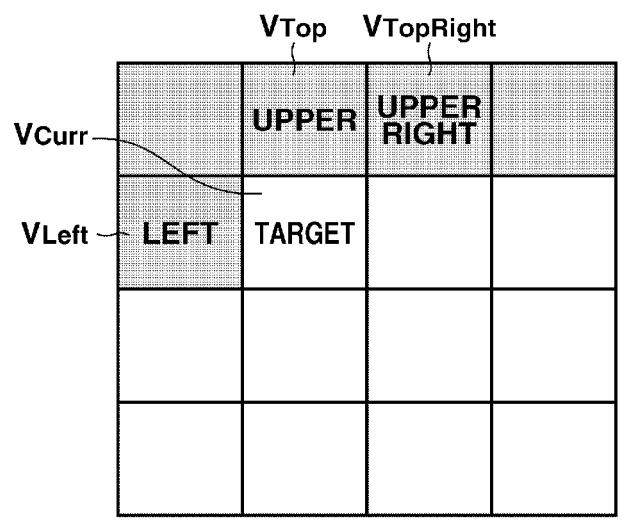
FIG. 12B illustrates a relation between positions of neighboring blocks.

In step S2021, the CPU 1101 selects one neighboring block having attribute information closest to that of the target divisional block. FIG. 12B illustrates a relation between the motion vector of the target divisional block and motion vectors of neighboring blocks. Although, in the present exemplary embodiment, neighboring blocks are considered to be blocks to the left, upside, and upper right of the target block as illustrated in FIG. 12B, the combination of blocks is not thereto. Although, in the present exemplary embodiment, selecting a block having attribute information closest to that of the target divisional block is equivalent to selecting a block providing a smallest difference value between the motion vector of the target divisional block and each of motion vectors of neighboring blocks, the processing is not limited thereto. When there is motion vector derivation block identification information for identifying a neighboring block having a similar motion vector as the target divisional block, the information may be used to select a block. Referring to FIG. 12B, for example, the target divisional block has a motion vector VCurr, the left block has a motion vector VLeft, the upper block has a motion vector VTop, and the upper right block has a motion vector VTopRight. In this case, since the motion vectors VCurr and VTop have a similar vector value, the upper block is selected. Although, in the present exemplary embodiment, when a plurality of blocks has closest or identical attribute information, a spatially closest block is selected, but the processing is not limited thereto.

In step S2030, the CPU 1101 sets the image quality control parameter of the block selected in step S2021 as a predicted image quality control parameter.

In many cases, a neighboring block having a similar attribute as the target divisional block is coded based on an image quality control parameter having an identical or close value. For example, blocks having a similar motion vector are highly likely to be included in a similar object. When performing processing for improving the image quality of a specific object, blocks having a similar motion vector are highly likely to be coded based on image quality control parameters having close values. Therefore, this technique provides a smaller absolute value of a difference value than a case of calculating a difference value simply by using an image quality control parameter of a last coded block, as a predicted image quality control parameter. This means that the technique provides a smaller amount of codes at the time of image quality control parameter coding. Therefore, a moving image having the equivalent image quality can be coded with a less bit rate.

An image decoding method according to a fourth exemplary embodiment of the present invention for decoding coded data generated by the image coding method according to the third exemplary embodiment will be described below with reference to FIG. 7. Unless otherwise described, the configuration and processing of each step in the present exemplary embodiment are similar to those of the second exemplary embodiment. An input bit stream is the bit stream generated in the third exemplary embodiment.

Figure 7:
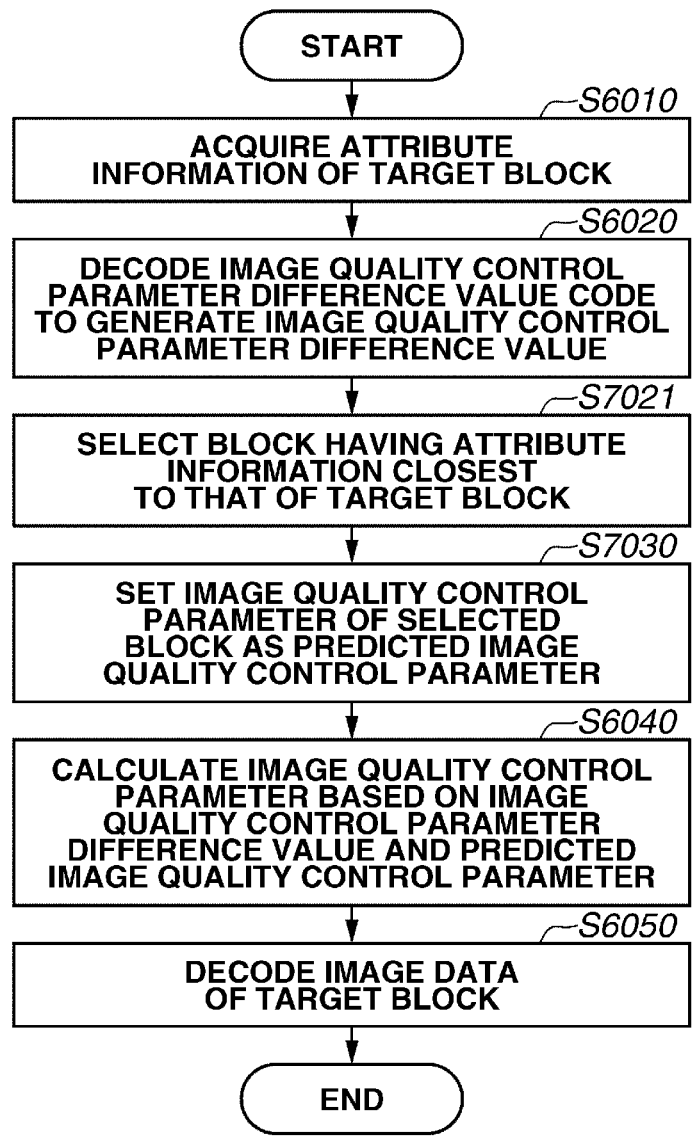
FIG. 7 is a flowchart illustrating a divisional block decoding method according to a fourth exemplary embodiment of the present invention.

FIG. 7 is a detailed flowchart illustrating the divisional block decoding processing in step S16050 in FIG. 16. In this flowchart, step S7021 is added following step S6020 in FIG. 6. In the fourth exemplary embodiment, the target block is an inter-block.

In step S7021, the CPU 1101 selects one neighboring block having attribute information closest to that of the target divisional block. Referring to FIG. 12B, similar to the third exemplary embodiment, since the motion vectors VCurr and VTop have a similar vector value, the upper block is selected. In this case, motion vectors may be directly compared to select a block. When there exists information for identifying a neighboring block having a similar motion vector as the target divisional block, the information may be used to select a block. Although, in the present exemplary embodiment, when a plurality of blocks has closest or identical attribute information, a spatially closest block is selected, but the processing is not limited thereto.

In step S7030, the CPU 1101 sets the image quality control parameter of the block selected in step S6021 as a predicted image quality control parameter. The predicted image quality control parameter determined here will be used in step S6040. Applying the technique according to the present exemplary embodiment enables decoding a bit stream coded by the image coding method according to the third exemplary embodiment.

An image coding method according to a fifth exemplary embodiment of the present invention will be described below with reference to FIG. 3. Unless otherwise described, the configuration and processing of each step in the present exemplary embodiment are similar to those of the first exemplary embodiment.

Figure 3:
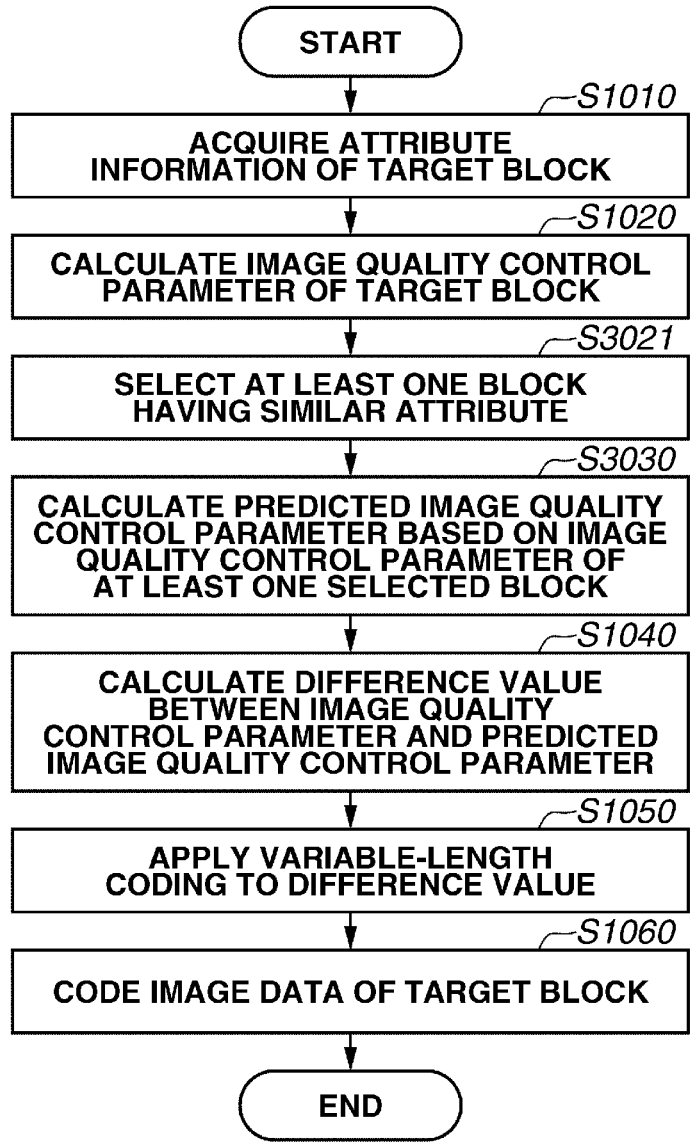
FIG. 3 is a flowchart illustrating a divisional block coding method according to a fifth exemplary embodiment of the present invention.

FIG. 3 is a detailed flowchart illustrating the divisional block coding method illustrated in step S15050 in FIG. 15. In this flowchart, step S3021 is added following step S1020 in FIG. 1.

In step S3021, the CPU 1101 selects at least one neighboring block having similar attribute information as the target divisional block. Although, in the present exemplary embodiment, neighboring blocks are considered to be blocks to the left, upside, and upper right of the target block as illustrated in FIG. 12A, the combination of blocks is not limited thereto. In the present exemplary embodiment, the block mode information is used as attribute information. Specifically, when the target divisional block is an intra-block, the CPU 1101 selects a neighboring intra-block. When the target divisional block is an inter-block, the CPU 1101 selects a neighboring inter-block.

In step S3030, the CPU 1101 calculates an average of image quality control parameters of at least one selected block, and sets it as a predicted image quality control parameter. Although, in the present exemplary embodiment, an average is used as a predicted image quality control parameter, the predicted image quality control parameter is not limited thereto, and may be a median.

Figure 23A:
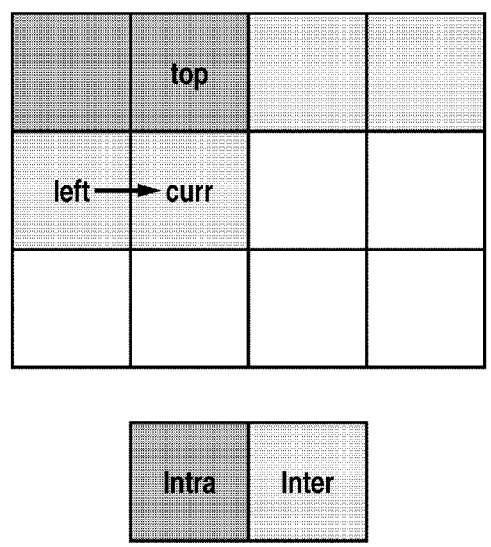
FIG. 23A illustrates an example operation of the divisional block coding method according to the fifth exemplary embodiment of operation.
Figure 23B:
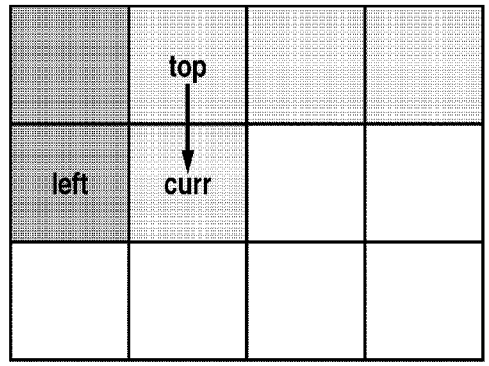
FIG. 23B illustrates an example operation of the divisional block coding method according to the fifth exemplary embodiment of operation.
Figure 23C:
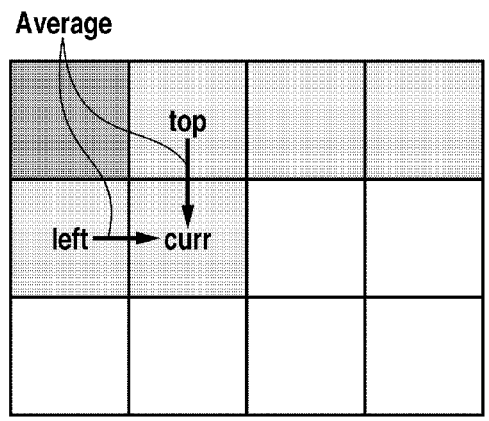
FIG. 23C illustrates an example operation of the divisional block coding method according to the fifth exemplary embodiment of operation.
Figure 23D:
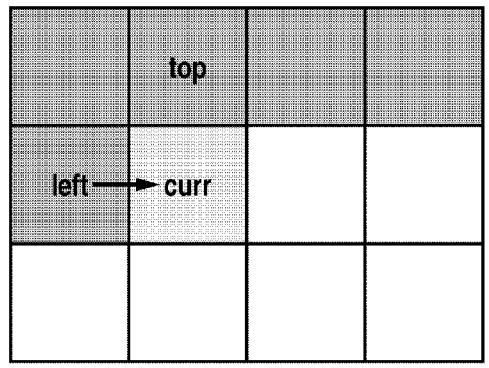
FIG. 23D illustrates an example operation of the divisional block coding method according to the fifth exemplary embodiment of operation.

FIGS. 23A, 23B, 23C, and 23D illustrate example processing according to the fifth exemplary embodiment. Referring to FIG. 23A, since a block to the left of the target divisional block is an inter-block, the left block is selected. Referring to FIG. 23B, since a block to the upside of the target divisional block is an inter-block, the upper block is selected. Referring to FIG. 23C, since blocks to the left and upside of the target divisional block are inter-blocks, an average of the left and upper blocks is selected. Referring to FIG. 23D, since blocks to the left and upside of the target divisional block are not inter-blocks, the left block is selected.

In many cases, a neighboring block having a similar attribute as the target divisional block is coded based on an image quality control parameter having an identical or close value. For example, a block at an edge portion of a moving subject is easily coded by intra-coding, and a block on the background or in a subject is easily coded by inter-coding. When performing code amount control for improving the image quality giving priority to an edge portion, it is effective to set an image quality control parameter to intra-coding blocks aiming for high image quality. Specifically, image quality control parameters of blocks having similar block mode information tend to have close values. Therefore, the technique according to the fifth exemplary embodiment provides a smaller absolute value of a difference value than a case of calculating a difference value simply by using an image quality control parameter of a last coded block, as a predicted image quality control parameter. This means that the technique provides a smaller amount of codes at the time of image quality control parameter coding.

An image decoding method according to a sixth exemplary embodiment of the present invention for decoding coded data generated by the image coding method according to the fifth exemplary embodiment will be described below with reference to FIG. 8. Unless otherwise described, the configuration and processing of each step in the present exemplary embodiment are similar to those of the second exemplary embodiment. An input bit stream is the bit stream generated in the fifth exemplary embodiment.

Figure 8:
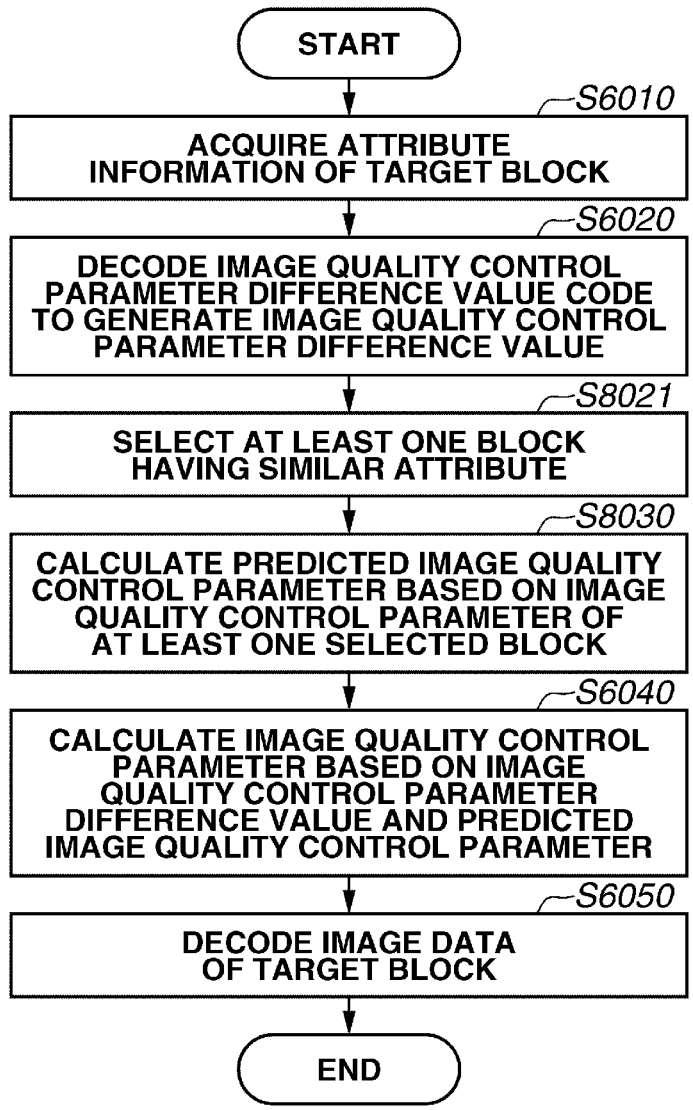
FIG. 8 is a flowchart illustrating a divisional block decoding method according to a sixth exemplary embodiment of the present invention.

FIG. 8 is a detailed flowchart illustrating the divisional block decoding processing in step S16050 in FIG. 16. In this flowchart, step S8021 is added following step S6020 in FIG. 6.

In step S8021, the CPU 1101 selects at least one neighboring block having similar attribute information as the target divisional block. Although, in the sixth exemplary embodiment, neighboring blocks are considered to be blocks to the left, upside, and upper right of the target block as illustrated in FIG. 12A, the combination of blocks is not limited thereto. Specifically, when the target divisional block is an intra-block, the CPU 1101 selects a neighboring intra-block. When the target divisional block is an inter-block, the CPU 1101 selects a neighboring inter-block.

In step S8030, the CPU 1101 calculates an average of image quality control parameters of at least one selected block, and sets it as a predicted image quality control parameter. Although, in the sixth exemplary embodiment, an average is used as a predicted image quality control parameter, the predicted image quality control parameter is not limited thereto, and may be a median. The predicted image quality control parameter determined here will be used in step S6040.

Applying the technique according to the sixth exemplary embodiment enables decoding a bit stream coded by the image coding method according to the fifth exemplary embodiment.

An image coding method according to a seventh exemplary embodiment of the present invention will be described below with reference in FIG. 4. Unless otherwise described, the configuration and processing of each step in the present exemplary embodiment are similar to those of the first exemplary embodiment.

Figure 4:
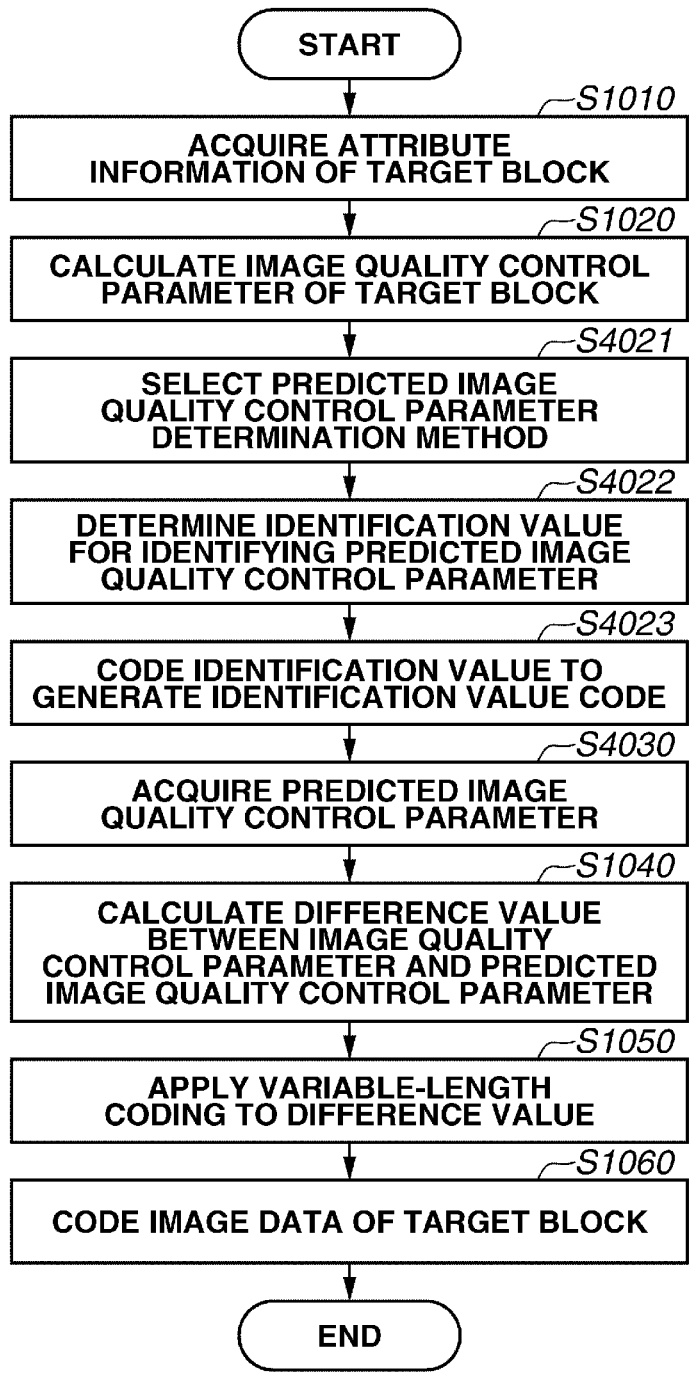
FIG. 4 is a flowchart illustrating a divisional block coding method according to a seventh exemplary embodiment of the present invention.

FIG. 4 is a flowchart illustrating a divisional block coding method illustrated in step S15050 in FIG. 15. In this flowchart, steps S4021, S4022, and S4023 are added following step S1020 in FIG. 1.

In step S4021, the CPU 1101 selects a predicted image quality control parameter determination method from a plurality of candidates. Although, in the present exemplary embodiment, the CPU 1101 selects a predicted image quality control parameter determination method out of the following four different methods ((0), (1), (2), and (3)), the combination is not limited thereto, and may be other determination methods or a part of the four methods. (0) Set an image quality control parameter of a divisional block spatially existing to the left of the target divisional block, as a predicted image quality control parameter. (1) Set an average of image quality control parameters of neighboring divisional blocks having similar attribute information as the target divisional block, as a predicted image quality control parameter. (2) Set a median of image quality control parameters of neighboring divisional blocks having similar attribute information as the target divisional block, as a predicted image quality control parameter. (3) Set an image quality control parameter of a last coded divisional block having similar attribute information as the target divisional block, as a predicted image quality control parameter. As concrete processing in step S4021, the CPU 1101 attempts the above-mentioned predicted image quality control parameter determination methods, and selects a predicted image quality control parameter determination method which provides a smallest difference value between the image quality control parameter of the target divisional block and the predicted image quality control parameter.

In step S4022, the CPU 1101 determines an identification value for identifying the predicted image quality control parameter determination method. In the present exemplary embodiment, the CPU 1101 sets an index value corresponding to the predicted image quality control parameter determination method determined in step S4021, as an identification value.

In step S4023, the CPU 1101 codes the above-mentioned identification value to generate an identification value code.

In step S4030, the CPU 1101 acquires a predicted image quality control parameter calculated by the predicted image quality control parameter determination method selected in step S4021.

Figure 18B:
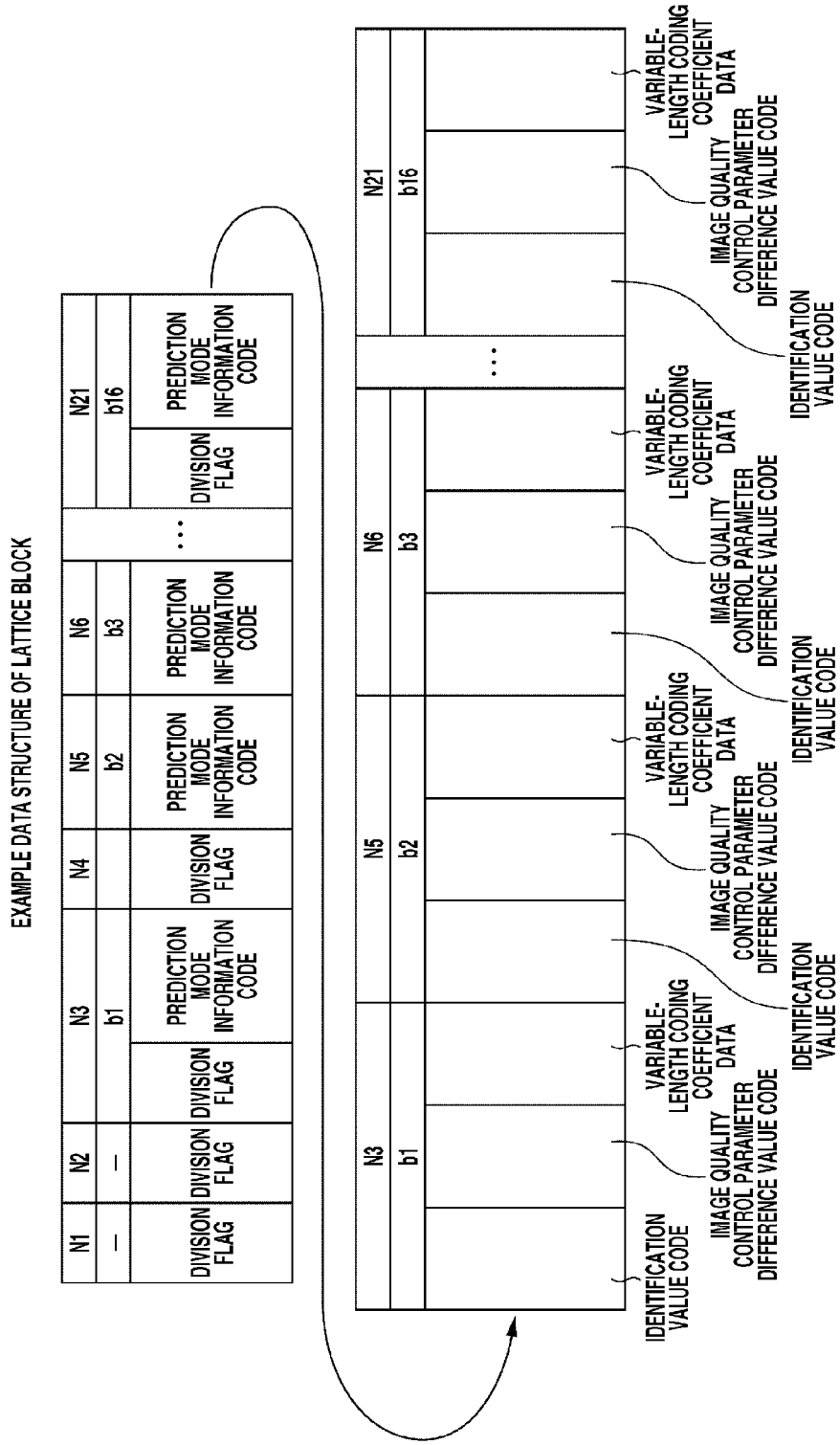
FIG. 18B illustrates an example configuration of bit streams of lattice blocks.
Figure 19A:
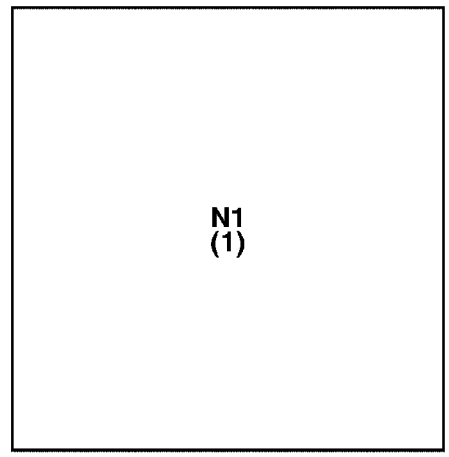
FIG. 19A illustrates an example division state of lattice blocks and division flags.
Figure 19B:
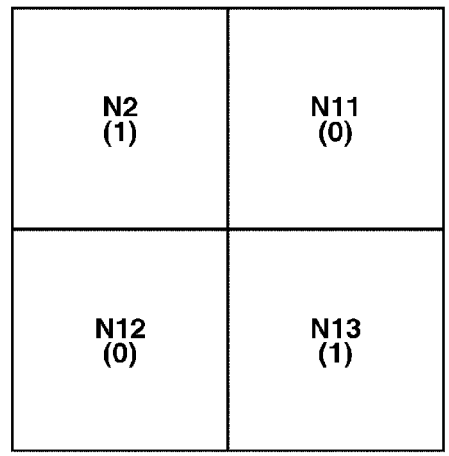
FIG. 19B illustrates an example division state of lattice blocks and division flags.
Figure 19C:
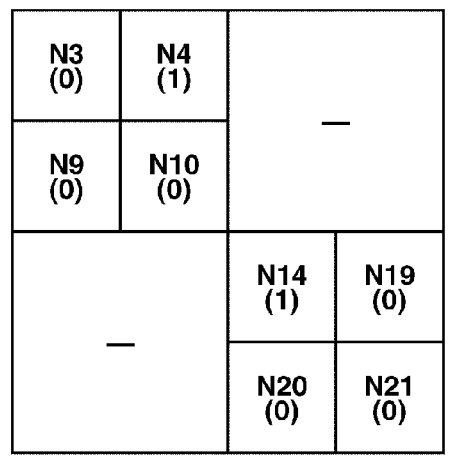
FIG. 19C illustrates an example division state of lattice blocks and division flags.

FIG. 18B illustrates a structure of a bit stream of a lattice block according to the seventh exemplary embodiment. Transmitting the bit stream to the decoding unit enables identifying the predicted image quality control parameter determination method also on side of the decoding unit.

According to the seventh exemplary embodiment, an optimum predicted image quality control parameter determination method can be selected. In the present exemplary embodiment, an optimum predicted image quality control parameter determination method is selected for each divisional block, and then the identification value is coded. However, the processing is not limited thereto. It is also possible to select an optimum predicted image quality control parameter determination method in unit of lattice block, slice, frame, or sequence, and embed the identification value in the header of the above-mentioned coding unit. For example, the identification value is embedded in the frame header in FIG. 17A.

An image decoding method according to an eighth exemplary embodiment of the present invention for decoding coded data generated by the image coding method according to the seventh exemplary embodiment will be described below with reference in FIG. 9. Unless otherwise described, the configuration and processing of each step in the present exemplary embodiment are similar to those of the second exemplary embodiment. An input bit stream is the bit stream generated in the seventh exemplary embodiment.

Figure 9:
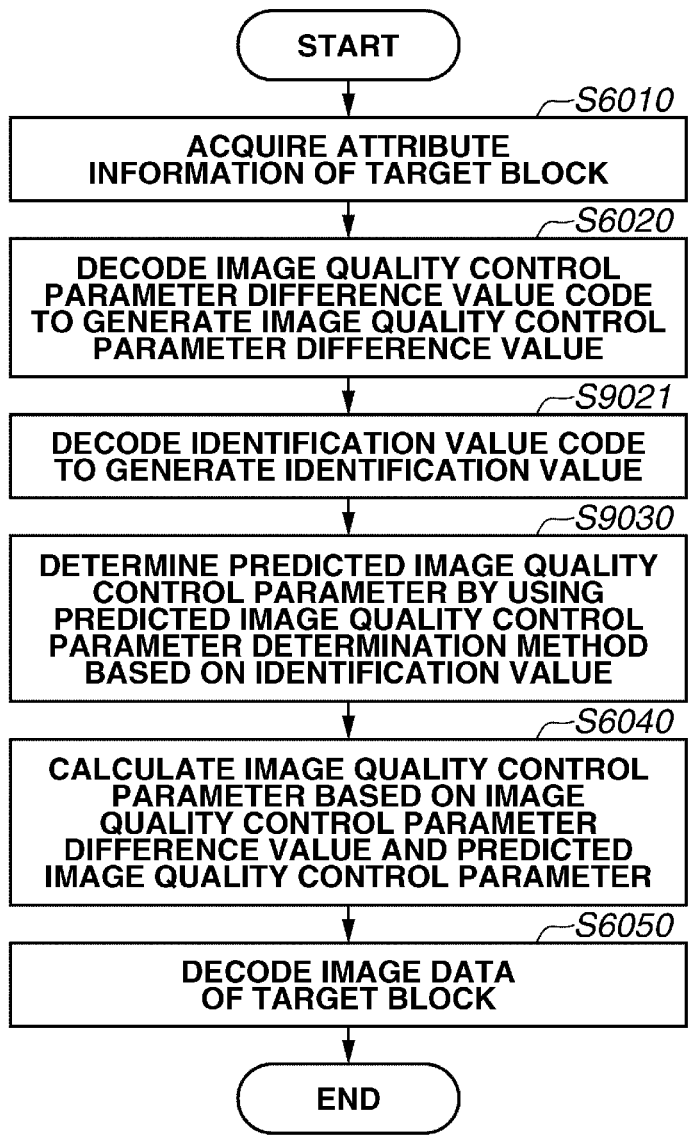
FIG. 9 is a flowchart illustrating a divisional block decoding method according to an eighth exemplary embodiment of the present invention.

FIG. 9 is a detailed flowchart illustrating the divisional block decoding processing in step S16050 in FIG. 16. In this flowchart, step S9021 is added following step S6020 in FIG. 2. In the eighth exemplary embodiment, the CPU 1101 decodes the bit stream generated in the seventh exemplary embodiment illustrated in FIG. 18B.

In step S6010, the CPU 1101 acquires attribute information of the target divisional block. Although, in the eighth exemplary embodiment, the block mode information for identifying intra- and inter-prediction is used as attribute information, the attribute information is not limited thereto. For example, the block size, motion vector, or intra-prediction method in intra-prediction may be used alone or in combination.

In step S9021, the CPU 1101 decodes the identification value code for identifying the predicted image quality control parameter determination method to generate an identification value. In the eighth exemplary embodiment, although the identification value corresponds to (0), (1), (2), and (3) described in the seventh exemplary embodiment, the identification value is not limited thereto.

In step S9030, the CPU 1101 determines a predicted image quality control parameter by using the predicted image quality control parameter determination method identified by the above-mentioned identification value. The predicted image quality control parameter determined here will be used in step S6040.

The decoding method according to the eighth exemplary embodiment enables decoding a bit stream coded by the image coding method according to the seventh exemplary embodiment.

An image coding method according to a ninth exemplary embodiment of the present invention will be described below with reference in FIG. 5. Unless otherwise described, the configuration and processing of each step in the present exemplary embodiment are similar to those of the first exemplary embodiment.

Figure 5:
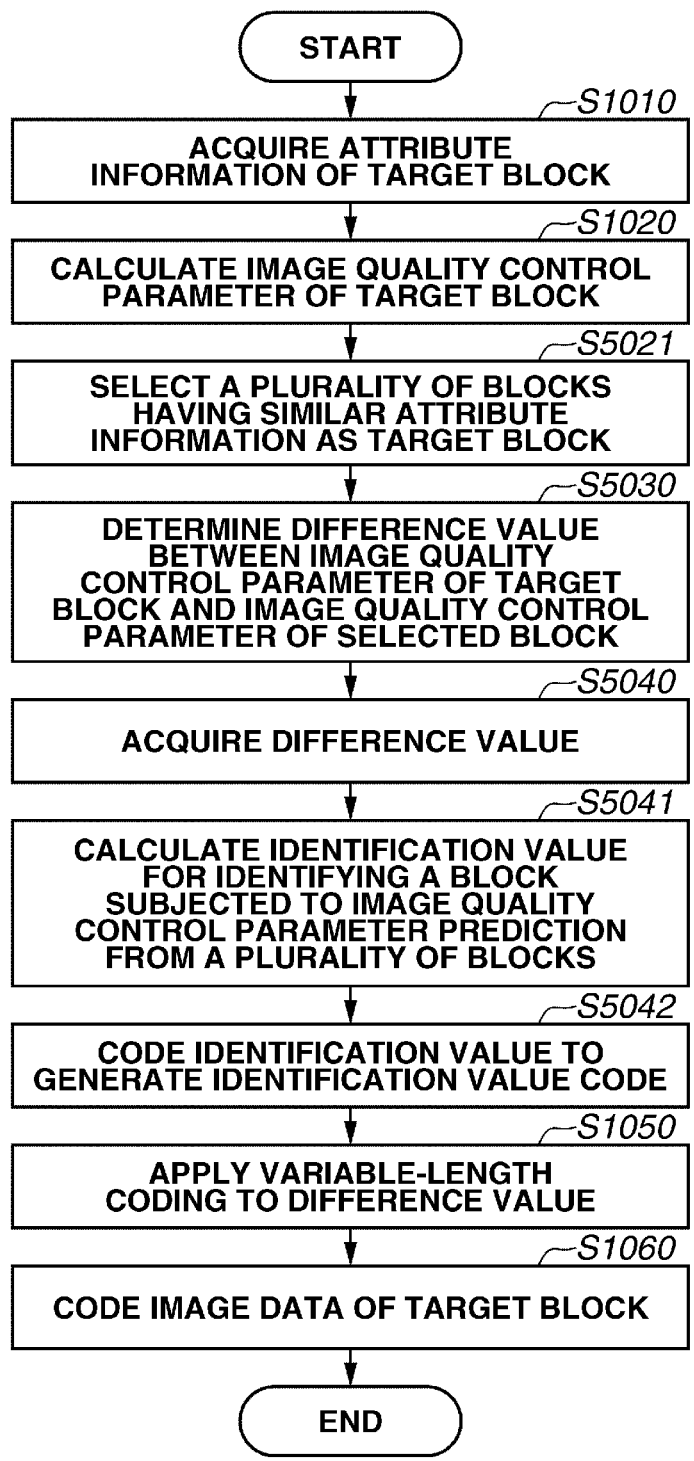
FIG. 5 is a flowchart illustrating a divisional block coding method according to a ninth exemplary embodiment of the present invention.

FIG. 5 is a detailed flowchart illustrating the divisional block coding processing in step S15050 in FIG. 15. In this flowchart, step S5021 is added following step S1020 in FIG. 1, and steps S5041 and S5042 are added following step S5040.

In step S5021, the CPU 1101 selects a plurality of neighboring blocks having similar attribute information as the target divisional block. Although, in the present exemplary embodiment, blocks to the left, upside, and upper right of the target block are selected as illustrated in FIG. 12A, the combination is not limited thereto. Although, in the ninth exemplary embodiment, all of the left, upper, and upper right blocks are selected when they have different modes, the combination is not limited thereto.

In step S5030, the CPU 1101 calculates a difference value between the image quality control parameter of the target divisional block and each of image quality control parameters of the selected blocks, and selects a block providing a smallest difference value. In step S5040, the CPU 1101 acquires a difference value calculated by using the image quality control parameter of the block selected in step S5030. This difference value will be coded in step S1050.

In step S5041, the CPU 1101 calculates an identification value for identifying a block subjected to image quality control parameter prediction out of the plurality of blocks. For example, this identification value can be calculated with reference to a table in FIG. 14. Referring to FIG. 14, "SELECTION OF BLOCK HAVING SIMILAR ATTRIBUTE" indicates whether divisional blocks existing to the left, upside, and upper right of the target divisional block are selected or not in step S5021. Identification codes in this table are assigned according to "SELECTION OF BLOCK HAVING SIMILAR ATTRIBUTE", and the identification codes corresponding to the left, upper, and upper right divisional blocks selected in step S5021 are used as identification values. In the table, "–" indicates that no identification code is assigned since no block is selected, and "×" indicates that a block can be uniquely identified even without coding the identification value.

In step S5042, the CPU 1101 codes the above-mentioned identification value to generate an identification value code. In the ninth exemplary embodiment, the CPU 1101 codes the above-mentioned identification value by using the coding method described in column "CODING METHOD" according to "SELECTION OF BLOCK HAVING SIMILAR ATTRIBUTE" in FIG. 14. In cases 1 and 8 in FIG. 14, the CPU 1101 generates variable-length Golomb codes and embeds them in a bit stream. In cases 2, 3, and 5 in FIG. 14, the CPU 1101 embeds values in a bit stream as 1-bit fixed length data. In cases 4, 6, and 7 in FIG. 14, the identification value code is not embedded in a bit stream since blocks can be uniquely identified. However, the coding method is not limited thereto.

According to the ninth exemplary embodiment, it is possible to select for each divisional block a neighboring divisional block having a predicted image quality control parameter that minimizes the amount of image quality control parameter codes of the target divisional block.

An image decoding method according to a tenth exemplary embodiment of the present invention for decoding coded data generated by the image coding method according to the ninth exemplary embodiment will be described below with reference in FIG. 10. Unless otherwise described, the configuration and processing of each step in the present exemplary embodiment are similar to those of the second exemplary embodiment. An input bit stream is the bit stream generated in the ninth exemplary embodiment.

Figure 10:
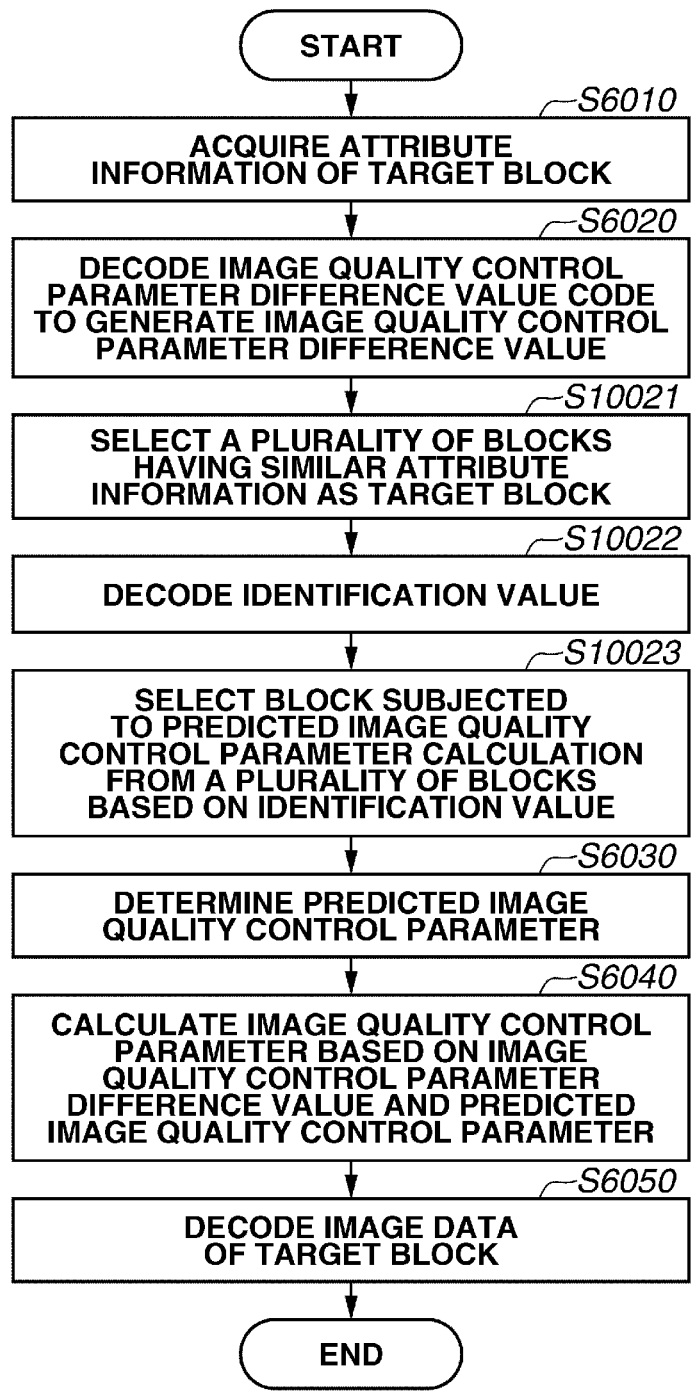
FIG. 10 is a flowchart illustrating a divisional block decoding method according to a tenth exemplary embodiment of the present invention.

FIG. 10 is a detailed flowchart illustrating the divisional block coding processing in step S16050 in FIG. 16. In this flowchart, steps S10021, S10022, and S10023 are added following step S6020 in FIG. 6.

In step S10021, the CPU 1101 selects a plurality of neighboring divisional blocks having similar attribute information as the target divisional block. Although, in the present exemplary embodiment, blocks to the left, upside, and upper right of the target block are selected as illustrated in FIG. 12A, the combination is not limited thereto as long as the attribute information is similar as the coding method. Although, in the ninth exemplary embodiment, all of the left, upper, and upper right blocks are selected when all of them have different modes, the combination is not limited thereto as long as the attribute information is similar to the coding method.

In step S10022, the CPU 1101 decodes the identification value based on the identification value code. Although, in the tenth exemplary embodiment, the CPU 1101 decodes the above-mentioned identification value by using the decoding method corresponding to the coding method described in column "CODING METHOD" according to "SELECTION OF BLOCK HAVING SIMILAR ATTRIBUTE" in FIG. 14, the processing is not limited thereto. In cases 2, 3, and 5 in FIG. 14, since a block can be uniquely identified and the identification value code is not embedded in a bit stream, the identification value code is not decoded.

In step S10023, the CPU 1101 selects a divisional block used for predicted image quality control parameter calculation based on the identification value. Specifically, in the present exemplary embodiment, the CPU 1101 identifies the left, upper, and upper right blocks based on "SELECTION OF BLOCK HAVING SIMILAR ATTRIBUTE" and the identification value in FIG. 14. Also in cases where the identification value code is not decoded in step S10022, the CPU 1101 can select one prediction block based on "SELECTION OF BLOCK HAVING SIMILAR ATTRIBUTE" in FIG. 14. The block selected here will be used in step S6030.

The decoding method according to the tenth exemplary embodiment enables decoding a bit stream coded by the image coding method according to the ninth exemplary embodiment.

An image coding method according to a eleventh exemplary embodiment of the present invention will be described below with reference in FIG. 21. Unless otherwise described, the configuration and processing of each step in the present exemplary embodiment are similar to those of the first exemplary embodiment.

In the present exemplary embodiment, the target divisional block is an intra-block. Although the prediction method for intra-prediction is any of DC prediction, horizontal prediction, vertical prediction, and planar prediction similar to the 16×16 intra-prediction block in H.264, the prediction method is not limited thereto.

Figure 21:
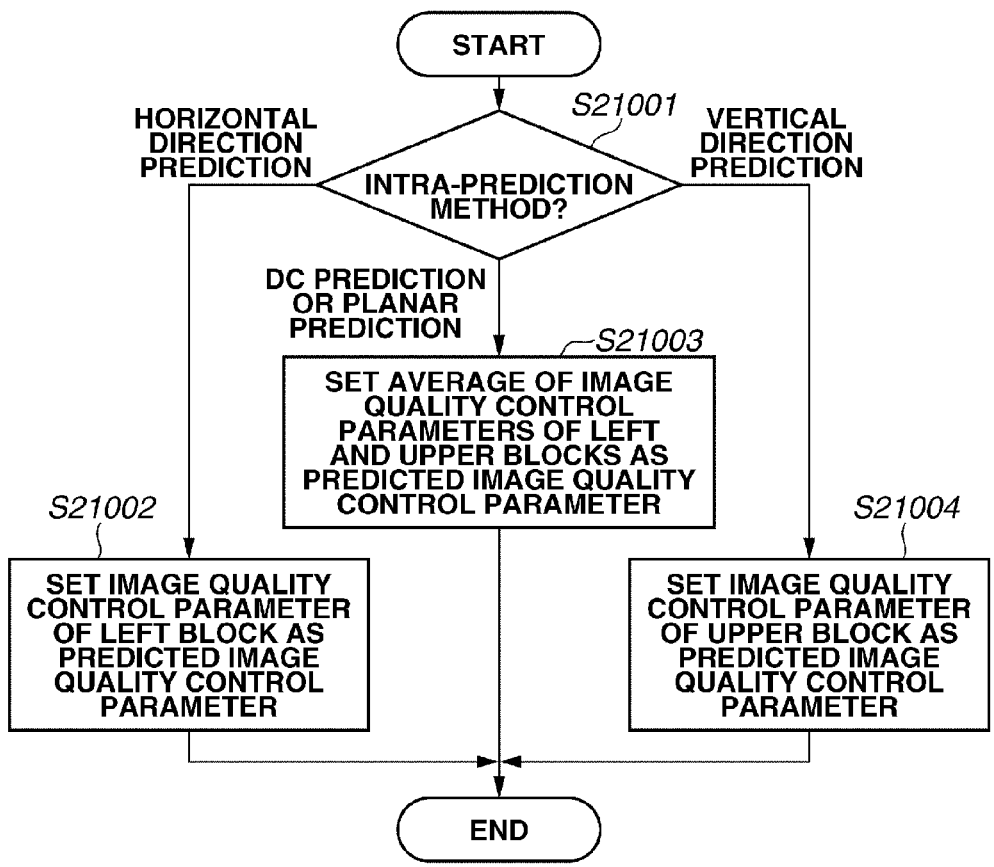
FIG. 21 is a flowchart illustrating processing for determining a predicted image quality control parameter based on an intra-prediction method.

FIG. 21 is a flowchart illustrating processing for determining a predicted image quality control parameter based on the intra-prediction method in step S1030 in FIG. 1.

In step S21001, the CPU determines the intra-prediction method of the target divisional block. When the intra-prediction method is horizontal direction prediction (HORIZONTAL DIRECTION PREDICTION in step S21001), the processing proceeds to step S21002. When the intra-prediction method is DC prediction or planar prediction (DC PREDICTION or PLANAR PREDICTION in step S21001), the processing proceeds to step S21003. When the intra-prediction method is vertical direction prediction (VERTICAL DIRECTION PREDICTION in step S21001), the processing proceeds to step S21004.

In step S21002, the CPU 1101 sets the image quality control parameter of the divisional block existing to the left of the target divisional block, as a predicted image quality control parameter.

In step S21003, the CPU 1101 sets an average of image quality control parameters of the divisional blocks existing to the left and upside of the target divisional block, as a predicted image quality control parameter.

In step S21004, the CPU 1101 sets the image quality control parameter of the divisional block existing to the upside of the target divisional block, as a predicted image quality control parameter.

Figures 24A, 24B:
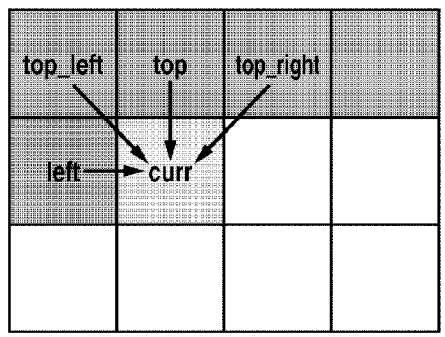
FIG. 24A illustrate an example predicted image quality control parameter acquisition method.
FIG. 24B illustrate the example predicted image quality control parameter acquisition method.
Figure 25:
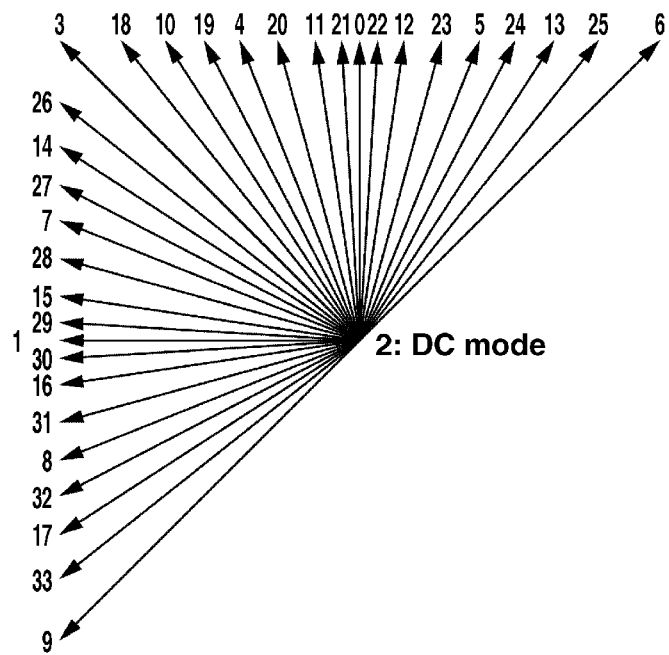
FIG. 25 is illustrates an index indicating prediction directions in intra-prediction.

However, the combination of the intra-prediction method and divisional blocks used for predicted image quality control parameter calculation is not limited thereto. For example, when the intra-prediction method has 34 directions as illustrates in FIG. 25, the CPU 1101 calculates predicted image quality control parameters as illustrated in FIG. 24A. In this case, when an index for indicating the prediction direction is 18, 10, or 19, for example, the CPU 1101 calculates an average of image quality control parameters of the divisional blocks existing to the left and upside of the target divisional block (top_left and top in FIG. 24B), as a predicted image quality control parameter of the target divisional block.

Blocks existing in the prediction direction of intra-prediction are highly likely to be included in a similar object. When performing processing for improving the image quality of a specific object, these blocks are highly likely to be coded based on image quality control parameters having similar values. Therefore, the technique according to the eleventh exemplary embodiment provides a smaller absolute value of a difference value than a case of calculating a difference value simply by using an image quality control parameter of a last coded block, as a predicted image quality control parameter. This means that the technique provides a smaller amount of codes at the time of image quality control parameter coding.

An image decoding method for decoding coded data generated by the image coding method according to the eleventh exemplary embodiment will be described below with reference in FIG. 21. Unless otherwise described, the configuration and processing of each step in the present exemplary embodiment are similar to those of the second exemplary embodiment. An input bit stream is the bit stream generated in the eleventh exemplary embodiment.

In a twelfth exemplary embodiment of the present invention, the target divisional block is an intra-block. Although the prediction method for intra-prediction is any of DC prediction, horizontal prediction, vertical prediction, and planar prediction similar to the 16×16 intra-prediction block in H.264, the prediction method is not limited thereto.

In step S6030 in FIG. 6, the CPU 1101 determines a predicted image quality control parameter based on the intra-prediction method following the flowchart in FIG. 21.

In step S21001, the CPU determines the intra-prediction method of the target divisional block. When the intra-prediction method is horizontal direction prediction (HORIZONTAL DIRECTION PREDICTION in step S21001), the processing proceeds to step S21002. When the intra-prediction method is DC prediction or planar prediction (DC PREDICTION or PLANAR PREDICTION in step S21001), the processing proceeds to step S21003. When the intra-prediction method is vertical direction prediction (VERTICAL DIRECTION PREDICTION in step S21001), the processing proceeds to step S21004.

In step S21002, the CPU 1101 sets the image quality control parameter of the divisional block existing to the left of the target divisional block, as a predicted image quality control parameter.

In step S21003, the CPU 1101 sets an average of image quality control parameters of the divisional blocks existing to the left and upside of the target divisional block, as a predicted image quality control parameter.

In step S21004, the CPU 1101 sets the image quality control parameter of the divisional block existing to the upside of the target divisional block, as a predicted image quality control parameter.

However, the combination of the intra-prediction method and the divisional blocks used for predicted image quality control parameter calculation is not limited thereto as long as the attribute information is similar to the coding method.

Applying the technique according to the twelfth exemplary embodiment enables decoding a bit stream coded by the image coding method according to the eleventh exemplary embodiment.

An image coding method according to a thirteenth exemplary embodiment of the present invention will be described below with reference in FIG. 2. Unless otherwise described, the configuration and processing of each step in the present exemplary embodiment are similar to those of the first and third exemplary embodiments.

In step S2021, the CPU 1101 selects a neighboring divisional block having similar attribute information as the target divisional block. In the thirteenth exemplary embodiment, a motion vector is used as attribute information. In the example in FIG. 12B, since the motion vectors VCurr and VTop have a similar vector value, the upper block is selected.

In step S2030, the CPU sets the image quality control parameter of the block selected in step S2021 as a predicted image quality control parameter.

In the thirteenth exemplary embodiment, in the case of a similar difference value between the motion vector of the target divisional block and each of motion vectors of neighboring blocks (calculated in step S2021), the image quality control parameter difference value code is not embedded in a bit stream. When the image quality control parameter difference value code is not embedded in a bit stream, the CPU 1101 skips steps S1040 and S1050 not to embed the image quality control parameter difference value code. In image block coding in step S1060, the CPU 1101 does not use the image quality control parameter calculated in step S1020. Instead, the CPU 1101 uses the predicted image quality control parameter determined in step S2030 as a parameter for image quality control.

It is useful to code a neighboring block having a similar attribute as the target divisional block, based on a similar image quality control parameter. For example, blocks having a similar motion vector as the target divisional block are highly likely to be included in a similar object. In this case, coding these blocks based on the similar image quality control parameter prevents an image quality difference from occurring in the similar object. By not embedding an image quality control parameter difference value in a bit stream, a moving image having the equivalent image quality can be coded with a less bit rate.

It is also possible to insert into a bit stream a code for identifying the existence of a neighboring block having a similar motion vector as the target divisional block and the position of the relevant neighboring block. When there exists a neighboring block having a similar motion vector as the target divisional block, the above-mentioned processing without embedding an image quality control parameter difference value code is performed. In this case, a motion vector is not embedded in the target divisional block. Applying the present exemplary embodiment further enables reducing the amount of codes at the time of image quality control parameter coding.

An image decoding method according to a fourteenth exemplary embodiment of the present invention for decoding a bit stream coded by the image coding method according to the first and thirteenth exemplary embodiments will be described below with reference in FIG. 7. Unless otherwise described, the configuration and processing of each step in the present exemplary embodiment are similar to those of the second and fourth exemplary embodiments.

In step S7021, the CPU 1101 selects a neighboring divisional block having similar attribute information as the target divisional block. In the fourteenth exemplary embodiment, a motion vector is used as attribute information. In the example in FIG. 12B, since motion vectors VCurr and VTop have a similar vector value, the upper block is selected.

In step S7030, the CPU 1101 sets the image quality control parameter of the block selected in step S7021 as a predicted image quality control parameter. The predicted image quality control parameter determined here will be used in step S6040. In the present exemplary embodiment, in the case of a similar difference value between the motion vector of the target divisional block and each of motion vectors of neighboring blocks (calculated in step S7021), the image quality control parameter difference value code is not decoded. When the image quality control parameter difference value code is not decoded, the CPU 1101 skips steps S6020 and S6040 and, in image block decoding in step S7040, uses the predicted image quality control parameter determined in step S7030 as a parameter for image quality control.

Applying the technique according to the fourteenth exemplary embodiment enables decoding a bit stream coded by the image coding method according to the third exemplary embodiment.

Also when a bit stream includes a code for identifying the existence of a neighboring block having a similar motion vector as the target divisional block and the position of the relevant neighboring block, the above-mentioned image quality control parameter difference value code may not decoded. In this case, the predicted image quality control parameter is the image quality control parameter of a block having a similar motion vector as the target divisional block, identified by the above-mentioned code. It is necessary that these pieces of processing correspond to the processing of the coding method.

Although, in the above-described exemplary embodiments, coded data is recorded on a HDD 903, the recording form of coded data is not limited thereto. For example, coded data may be recorded on a recording medium other than a hard disk drive. Further, coded data may be transmitted to a communication line via a communication interface 905, or recorded on a portable medium in a connected external recording device.

Although, in the above-described exemplary embodiments, software is recorded on a hard disk drive, the recording form of software is not limited thereto. For example, the software may be recorded on a hardware unit such as a ROM or a portable medium such as a memory card and a disk.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-051269 filed Mar. 9, 2011, which is hereby incorporated by reference herein in its entirety.

The invention claimed is:

1. An image coding method for dividing an input image into a plurality of divisional blocks, and coding the image for each of the divisional blocks, the image coding method comprising:

setting a first quantization parameter used for quantization of a target block;

acquiring a plurality of pieces of attribute information for the target block to be decoded in association with decoding of coded data encoded by using the image coding method, the plurality of pieces of attribute information including a quantization parameter to be set for each block and another piece of attribute information;

acquiring the plurality of pieces of attribute information for a block in a region different from a region corresponding to the target block;

determining, based on the another piece of attribute information for the target block and the another piece of attribute information in the block in the region different from the region corresponding to the target block, one or more blocks, from at least one block in the region different from the region corresponding to the target block, as a block(s) for coding information for designating the first quantization parameter, and coding a difference value between the first quantization parameter and a second quantization parameter as information for designating the first quantization parameter, the second quantization parameter being a quantization parameter to be used for quantizing the determined block in the different region and different from the first quantization parameter or a quantization parameter based on the other quantization parameter.

2. The image coding method according to claim 1, wherein a quantization parameter used for quantization for the block determined from the at least one block other than the target block, the determined block being coded before the target block, an attribute of the determined block corresponding to the attribute information of the target block, is acquired as the other quantization parameter in the determined block in the different region.

3. The image coding method according to claim 1, wherein a quantization parameter used for quantization for the block determined from the at least one block other than the target block, an attribute of the determined block is same as the attribute information of the target block, is acquired as the other quantization parameter in the determined block in the different region.

4. The image coding method according to claim 1, wherein the other quantization parameter used for quantization for the block determined from the at least one block other than the target block, the determined block being spatially nearest to the target block in a case where there are multiple blocks including an attribute same as or close to the attribute information of the target block, is acquired as the other quantization parameter in the determined block in the different region.

5. The image coding method according to claim 1, wherein an average value or an intermediate value of quantization parameters is determined as the second quantization parameter, the quantization parameters used for quantization for each of the multiple blocks including an attribute same as or close to the attribute information of the target block.

6. The image coding method according to claim 1, wherein the other quantization parameter used for quantization for the block determined from the at least one block other than the target block, the determined block having been lastly encoded among the at least one block other than the target block including an attribute same as the attribute information of the target block, is acquired as the other quantization parameter in the determined block in the different region.

7. The image coding method according to claim 1, wherein the plurality of pieces of attribute information includes at least one of a block size, a prediction mode, a motion vector, and an intra-prediction method indicating a direction in intra-prediction.

8. The image coding method according to claim 1, wherein a quantization parameter used for quantization for the one or more blocks determined from the at least one block other than the target block, the determined one or more blocks each including an attribute corresponding to the attribute information of the target block and being among blocks around the target block, is acquired as the other quantization parameter in the determined block in the different region.

9. The image coding method according to claim 1, wherein a quantization parameter used for quantization for the one or more blocks determined from the at least one block other than the target block, the determined one or more blocks each including an attribute corresponding to the attribute information of the target block and being among blocks adjacent to the target block on left, upper and upper right sides, is acquired as the other quantization parameter in the determined block in the different region.

10. The image coding method according to claim 1, wherein the plurality of pieces of attribute information includes information of a prediction mode indicating whether a block is an inter-block or an intra-block, and wherein a parameter corresponding to a block being an inter-block, among the one or more blocks determined from the at least one block other than the target block, is acquired as the other quantization parameter in the determined block in the different region in a case where the target block is an inter-block, and a parameter corresponding to a block being an intra-block, among the determined one or more blocks determined from the at least one block other than the target block, is acquired as the other quantization parameter in the determined block in the different region in a case where the target block is an intra-block.

11. The image coding method according to claim 1, wherein a quantization parameter used for quantization for a block on the left side of the target block is acquired as the other quantization parameter in the determined block in the different region in a case where there is no block including an attribute same as or close to the attribute information of the target block.

12. The image coding method according to claim 1, further comprising:
   acquiring information on whether the at least one block other than the target block is a block including the attribute same as or close to the attribute information of the target block or a block not including the attribute same as or close to the attribute information of the target block,
   wherein a quantization parameter for the one or more blocks determined from the at least one block other than the target block is acquired as the other quantization parameter in the determined block in the different region, based on a difference between quantization parameters used for quantization for each of blocks around the target block and the first quantization parameter in a case where second information is acquired, the second information indicating that a block around the target block is a block not including the attribute same as or close to the attribute information of the target block.

13. The image coding method according to claim 1, wherein the plurality of pieces of attribute information includes information on a motion vector of a block, and wherein a quantization parameter corresponding to a block other than the target block, an absolute value of a difference between a motion vector corresponding to the block other than the target block and a motion vector of the target block being smaller than a first predetermined value, among the at least one block other than the target block, is acquired as the other quantization parameter in the determined block in the different region.

14. The image coding method according to claim 1, wherein the first quantization parameter for controlling an encoding amount of the encoded data obtained by encoding the target block to a preset second predetermined value is acquired as the other quantization parameter in the determined block in the different region.

15. The image coding method according to claim 1, wherein the other quantization parameter is used as a predictive quantization parameter.

16. An image decoding method for decoding coded data obtained by coding a block in an image including a plurality of blocks, the image decoding method comprising:
   decoding, from the coded data, in a case where the image is decoded, a plurality of pieces of attribute information for a target block, the plurality of pieces of attribute information including first information for calculating a quantization parameter to be set for each block and another piece of attribute information to be set for each block, the first information indicating a difference between a first quantization parameter and a second quantization parameter to be used for inverse quantization of the target block;
   determining, based on the another piece of attribute information for the target block and the another piece of attribute information for a block in a region different from a region corresponding to the target block, one or more blocks from at least one block in the region different from the region corresponding to the target block as a block for calculating the first quantization parameter; and calculating the first quantization parameter used for quantization of the target block, based on the second quantization parameter and the difference value, the second quantization parameter being the other quantization parameter different from the first quantization parameter in the determined block in the different region or a quantization parameter based on the other quantization parameter.

17. The image decoding method according to claim 16, wherein the other quantization parameter used for inverse quantization for the one or more blocks determined from the at least one block other than the target block, the determined one or more blocks being decoded before the target block, an attribute of the determined one or more blocks corresponding to the attribute information of the target block, is derived as the other quantization parameter in the determined block in the different region.

18. The image decoding method according to claim 16, wherein the other quantization parameter used for inverse quantization for the one or more blocks determined from the at least one block other than the target block, an attribute of determined one or more blocks being same as the attribute information of the target block, is derived as the other quantization parameter in the determined block in the different region.

19. The image decoding method according to claim 16, wherein the other quantization parameter used for inverse quantization for the one or more blocks determined from the at least one block other than the target block, the determined one or more blocks being spatially nearest to the target block in a case where there are multiple blocks including an attribute same as or close to the attribute information of the target block, is derived as the other quantization parameter in the determined block in the different region.

20. The image decoding method according to claim 16, wherein an average value or an intermediate value of quantization parameters is determined as the second quantization parameter, the quantization parameters being used for inverse quantization for each of the multiple blocks including an attribute same as or close to the attribute information of the target block.

21. The image decoding method according to claim 16, wherein the other quantization parameter used for inverse quantization for the one or more blocks determined from the at least one block other than the target block, the determined one or more blocks having been lastly decoded among blocks including the attribute same as the attribute information of the target block in the determined block in the different region, is derived as the other quantization parameter.

22. The image decoding method according to claim 16, wherein the plurality of pieces of attribute information includes at least one of a block size, a prediction mode, a motion vector, and an intra-prediction method indicating a direction in intra-prediction.

23. The image decoding method according to claim 16, wherein a quantization parameter used for inverse quantization for the one or more blocks determined from the at least one block other than the target block, the determined one or more blocks including an attribute corresponding to the attribute information of the target block and being among blocks around the target block, is derived as the other quantization parameter in the determined block in the different region.

24. The image decoding method according to claim 16, wherein a quantization parameter used for inverse quantization for the one or more blocks determined from the at least one block other than the target block, the determined one or more blocks including an attribute corresponding to the attribute information of the target block and being among blocks adjacent to the target block on left, upper and upper right sides, is derived as the other quantization parameter in the determined block in the different region.

25. The image decoding method according to claim 16, wherein the plurality of pieces of attribute information includes information of a prediction mode indicating whether a block is an inter-block or an intra-block, and wherein a quantization parameter corresponding to the determined block which is an inter-block among the at least one block other than the target block is derived as the other quantization parameter in a case where the target block is an inter-block, and a quantization parameter corresponding to the second block which is an intra-block among the at least one block other than the target block is derived as the other quantization parameter in the determined block in the different region in a case where the target block is an intra-block.

26. The image decoding method according to claim 16, wherein a quantization parameter used for inverse quantization for a block on the left side of the target block is derived as the other quantization parameter in the determined block in the different region in a case where there is no block including an attribute same as or close to the attribute information of the target block.

27. The image decoding method according to claim 16, further comprising:
deriving information on whether the at least one block other than the target block is a block including the attribute same as or close to the attribute information of the target block or a block not including the attribute same as or close to the attribute information of the target block,
wherein a quantization parameter of the block selected from a block other than the target block is derived as the other quantization parameter in the determined block in the different region, based on a difference between quantization parameters used for inverse quantization for each of blocks around the target block and the first quantization parameter in a case where second information is derived, the second information indicating a block around the target block is a block not including the attribute same as or close to the attribute information of the target block.

28. The image decoding method according to claim 16, wherein the plurality of pieces of attribute information includes information on a motion vector of a block, and wherein a quantization parameter corresponding to a block other than the target block, an absolute value of a difference between a motion vector corresponding to the block other than the target block and a motion vector of the target block being smaller than a first predetermined value, among the at least one block other than the target block, is derived as the other quantization parameter in the determined block in the different region.

29. The image decoding method according to claim 16, wherein the other quantization parameter is used as a predictive quantization parameter.

30. An image coding apparatus configured to divide an input image into a plurality of divisional blocks, and to code the image for each of the divisional blocks, the image coding apparatus comprising:
 at least one memory;
 at least one processor coupled to the at least one memory which executes the following:
 setting a first quantization parameter used for quantization of a target block;
 acquiring a plurality of pieces of attribute information for the target block to be decoded in association with decoding of coded data encoded by using the image coding method, the plurality of pieces of attribute information including a quantization parameter to be set for each block and another piece of attribute information;
 acquiring the plurality of pieces of attribute information for a block in a region different from a region corresponding to the target block;
 determining, based on the another piece of attribute information for the target block and the another piece of attribute information in the block in the region different from the region corresponding to the target block, one or more blocks, from at least one block in the region different from the region corresponding to the target block, as a block(s) for coding information for designating the first quantization parameter, and
 coding a difference value between the first quantization parameter and a second quantization parameter as information for designating the first quantization parameter, the second quantization parameter being a quantization parameter to be used for quantizing the determined block in the different region and different from the first quantization parameter or a quantization parameter based on the other quantization parameter.

31. An image decoding apparatus configured to decode coded data obtained by coding a block in an image including a plurality of blocks, the image decoding apparatus comprising:
 at least one memory;
 at least one processor coupled to the at least one memory which executes the following:
 decoding, from the coded data, in a case where the image is decoded, a plurality of pieces of attribute information for a target block, the plurality of pieces of attribute information including first information for calculating a quantization parameter to be set for each block and another piece of attribute information to be set for each block, the first information indicating a difference between a first quantization parameter and a second quantization parameter to be used for inverse quantization of the target block;
 determining, based on the another piece of attribute information for the target block and the another piece of attribute information for a block in a region different from a region corresponding to the target block, one or more blocks from at least one block in the region different from the region corresponding to the target block as a block for calculating the first quantization parameter; and
 calculating the first quantization parameter used for quantization of the target block, based on the second quantization parameter and the difference value, the second quantization parameter being the other quantization parameter different from the first quantization parameter in the determined block in the different region or a quantization parameter based on the other quantization parameter derived.

32. A non-transitory computer-readable storage medium storing a computer program for causing a computer to execute a method comprising:
 setting a first quantization parameter used for quantization of a target block;
 acquiring a plurality of pieces of attribute information for the target block to be decoded in association with decoding of coded data encoded by using the image coding method, the plurality of pieces of attribute information including a quantization parameter to be set for each block and another piece of attribute information;
 acquiring the plurality of pieces of attribute information for a block in a region different from a region corresponding to the target block;
 determining, based on the another piece of attribute information for the target block and the another piece of attribute information in the block in the region different from the region corresponding to the target block, one or more blocks, from at least one block in the region different from the region corresponding to the target block, as a block(s) for coding information for designating the first quantization parameter, and
 coding a difference value between the first quantization parameter and a second quantization parameter as information for designating the first quantization parameter, the second quantization parameter being a quantization parameter to be used for quantizing the determined block in the different region and different from the first quantization parameter or a quantization parameter based on the other quantization parameter.

33. A non-transitory computer-readable storage medium storing a computer program for causing a computer to execute a method comprising:
 decoding, from the coded data, in a case where the image is decoded, a plurality of pieces of attribute information for a target block, the plurality of pieces of attribute information including first information for calculating designating a quantization parameter to be set for each block and another piece of attribute information to be set for each block, the first information indicating a difference between a first quantization parameter and a second quantization parameter to be used for inverse quantization of the target block;
 determining, based on the another piece of attribute information for the target block and the another piece of attribute information for a block in a region different from a region corresponding to the target block, one or more blocks from at least one block in the region different from the region corresponding to the target block as a block for calculating the first quantization parameter; and
 calculating the first quantization parameter used for quantization of the target block, based on the second quantization parameter and the difference value, the second quantization parameter being the other quantization parameter different from the first quantization parameter in the determined block in the different region or a quantization parameter based on the other quantization parameter derived.

* * * * *